(12) United States Patent
Xiong et al.

(10) Patent No.: US 12,166,542 B2
(45) Date of Patent: Dec. 10, 2024

(54) SYSTEM AND METHOD FOR SYSTEM INFORMATION TRANSMISSION IN STAND-ALONE MMWAVE SYSTEMS

(71) Applicant: Apple Inc., Cupertino, CA (US)

(72) Inventors: Gang Xiong, Portland, OR (US); Yushu Zhang, Beijing (CN); Huaning Niu, San Jose, CA (US); Yuan Zhu, Beijing (CN); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 17/315,999

(22) Filed: May 10, 2021

(65) Prior Publication Data

US 2021/0266043 A1     Aug. 26, 2021

Related U.S. Application Data

(63) Continuation of application No. 16/065,068, filed as application No. PCT/US2016/039085 on Jun. 23, 2016, now Pat. No. 11,005,539.

(60) Provisional application No. 62/287,250, filed on Jan. 26, 2016.

(51) Int. Cl.
*H04B 7/0408* (2017.01)
*H04B 7/06* (2006.01)
*H04W 48/12* (2009.01)

(52) U.S. Cl.
CPC ......... *H04B 7/0408* (2013.01); *H04B 7/0617* (2013.01); *H04W 48/12* (2013.01)

(58) Field of Classification Search
None
See application file for complete search history.

(56) References Cited

U.S. PATENT DOCUMENTS

| 10,172,135 B2 | 1/2019 | Deng et al. |
|---|---|---|
| 2009/0046582 A1 | 2/2009 | Sarkar et al. |
| 2010/0322169 A1 | 12/2010 | Narasimha |
| 2013/0053077 A1 | 2/2013 | Barbieri et al. |

(Continued)

FOREIGN PATENT DOCUMENTS

| EP | 2 945 405 A1 | 11/2015 |
|---|---|---|
| WO | WO 2013/006379 | 1/2013 |
| WO | WO 2015/088419 | 6/2015 |

OTHER PUBLICATIONS

International Preliminary Report on Patentability directed to related International Patent Application No. PCT/US16/39085, dated Aug. 9, 2018.

*Primary Examiner* — Nguyen H Ngo
(74) *Attorney, Agent, or Firm* — Sterne, Kessler, Goldstein & Fox P.L.L.C.

(57) ABSTRACT

Described is an apparatus of a fifth generation (5G) Evolved Node-B (eNB) operable to communicate with a 5G User Equipment (UE) on a wireless network comprising one or more processors operable to generate one or more 5G Physical Downlink Shared Channel (xPDSCH) transmissions. The one or more processors may be operable to arrange the one or more xPDSCH transmissions for transmission through one or more respectively corresponding beamformed (Tx) beams. The one or more xPDSCH transmissions may carry one or more respectively corresponding 5G System Information Blocks (xSIBs).

18 Claims, 11 Drawing Sheets

(56) References Cited

U.S. PATENT DOCUMENTS

| | | | | |
|---|---|---|---|---|
| 2013/0121185 A1* | 5/2013 | Li | ........................ | H04B 7/0617 |
| | | | | 370/252 |
| 2013/0286960 A1* | 10/2013 | Li | ........................ | H04B 7/0684 |
| | | | | 370/329 |
| 2013/0301597 A1* | 11/2013 | Kim | ...................... | H04L 5/0037 |
| | | | | 370/329 |
| 2014/0112290 A1* | 4/2014 | Chun | ........................ | H04L 5/00 |
| | | | | 370/329 |
| 2014/0120926 A1* | 5/2014 | Shin | ...................... | H04W 48/12 |
| | | | | 455/450 |
| 2014/0286285 A1* | 9/2014 | Park | ...................... | H04W 72/20 |
| | | | | 370/329 |
| 2014/0293908 A1 | 10/2014 | Kumar et al. | | |
| 2014/0334372 A1* | 11/2014 | Vos | ........................ | H04W 48/10 |
| | | | | 370/312 |
| 2015/0098418 A1 | 4/2015 | Madhavan | | |
| 2015/0117410 A1 | 4/2015 | Wu et al. | | |
| 2016/0150506 A1 | 5/2016 | Tabet et al. | | |
| 2016/0353473 A1* | 12/2016 | Chen | ........................ | H04W 4/70 |
| 2017/0105166 A1* | 4/2017 | Lee | ........................ | H04W 48/12 |
| 2018/0220394 A1* | 8/2018 | Bontu | ................ | H04W 52/0216 |
| 2018/0234998 A1* | 8/2018 | You | ................... | H04W 72/1273 |
| 2018/0269953 A1* | 9/2018 | Kang | .................... | H04B 7/0408 |
| 2019/0013842 A1 | 1/2019 | Xiong et al. | | |

* cited by examiner

SYSTEM AND METHOD FOR SYSTEM INFORMATION TRANSMISSION IN STAND-ALONE MMWAVE SYSTEMS

CLAIM OF PRIORITY

The present application is a continuation of U.S. patent application Ser. No. 16/065,068, filed Jun. 21, 2018, now allowed, which is a U.S. National Phase of International Application No. PCT/US2016/039085, filed Jun. 23, 2016, which claims benefit to U.S. Provisional Patent Application Ser. No. 62/287,250 filed Jan. 26, 2016 and entitled "Information Transmission In Stand-Alone mmWave System," all of which are herein incorporated by reference in their entireties.

BACKGROUND

Various wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system Various next-generation wireless cellular communication systems are being developed, such as a fifth generation (5G) wireless system/5G mobile networks system Next-generation wireless cellular communication systems may provide support for higher bandwidths in part by supporting higher carrier frequencies, such as centimeter-wave and millimeter-wave frequencies.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
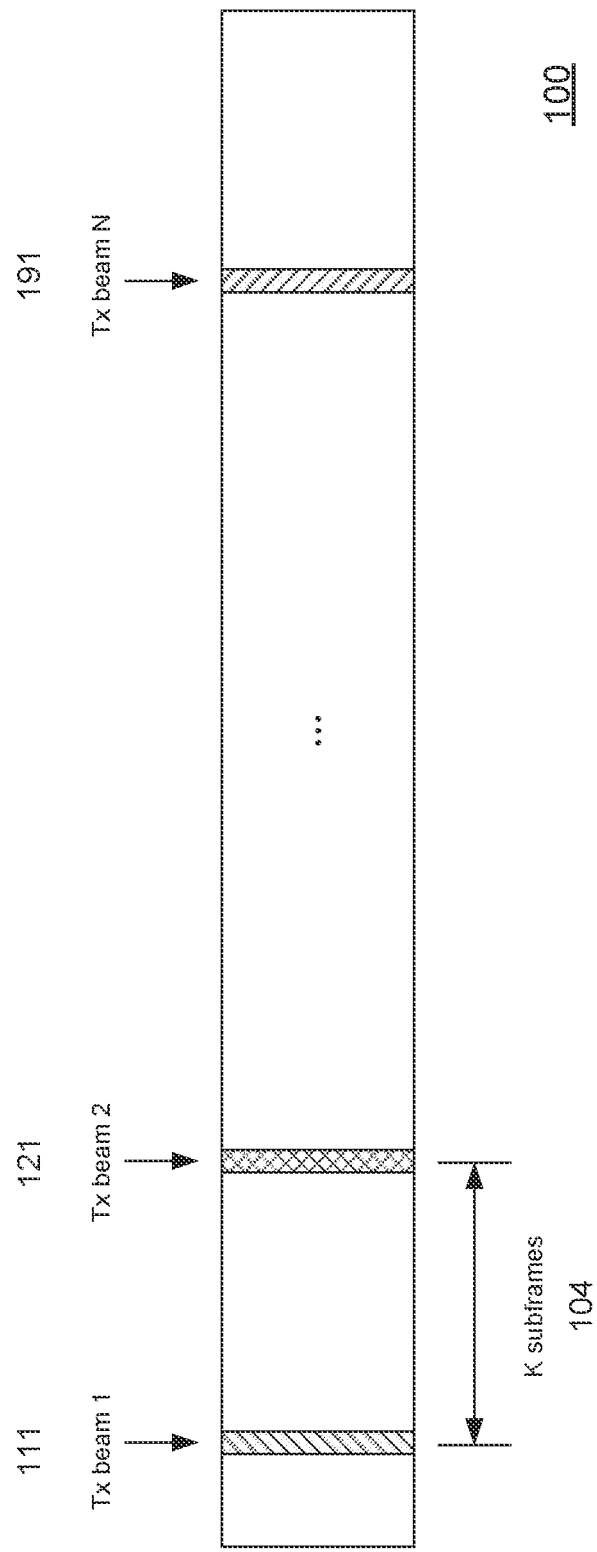
FIG. 1 illustrates a periodic fifth-generation (5G) System Information Block (xSIB) transmission, in accordance with some embodiments of the disclosure.

Various wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system Next-generation wireless cellular communication systems that are being developed, such as a fifth generation (5G) wireless system/5G mobile networks system, may improve access to information and sharing of data by various users and applications.

5G systems may provide improved user experiences with faster, better, simpler, richer, and more seamless wireless connectivity for content and services. In general, 5G systems may be based upon LTE-A systems with additional new Radio Access Technologies (RATs). 5G systems may provide unified networks and systems to support various services and applications that may have different and sometimes conflicting performance requirements.

5G systems may support higher-speed user experiences by supporting higher bandwidths. In turn, higher bandwidths may be achieved at least in part by supporting higher carrier frequencies, such as by supporting centimeter-wave (cm-Wave) or millimeter-wave (mmWave) frequencies. However, mid-band frequencies (e.g., carrier frequencies between 6 gigahertz (GHz) and 30 GHz, or between 50 mm wavelength and 10 mm wavelength) and high-band frequencies (e.g., carrier frequencies of 30 GHz and above) may be subject to severe path loss, which can severely deteriorate signal strength and thereby damage performance of wireless communications employing those frequencies. Beamforming may at least partially compensate for the severe path loss of these cm Wave and mm Wave frequencies by directing radiation in narrow beam widths toward target users, which may accordingly improve signal quality, improve coverage range, and reduce inter-user interference.

For a 5G Evolved Node-B (eNB) (or Access Point (AP)), Downlink (DL) transmissions may accordingly employ Transmitting (Tx) beamforming. Different Tx beams may be used to send a 5G User Equipment (UE) (or Station (STA)) specific transmissions to different UEs. In 5G systems, for signals that may be broadcast, Tx beam sweeping or aggregated Tx-beam-based transmissions may help ensure sufficient coverage for 5G cells.

Discussed herein are various scenarios for stand-alone 5G eNB deployments using cmWave and mmWave frequencies to send 5G System Information Block (xSIB) transmissions by sweeping across sets of Tx beams. Mechanisms for xSIB transmission with Tx beamforming are discussed. In some embodiments, xSIB transmission via sweeping across Tx beams may be employed in conjunction with Incremental Redundancy, such as through Redundancy Version patterns. For some embodiments, xSIB transmissions may be based upon a Tx beam index.

Scheduling of xSIB transmission is also discussed herein. In some embodiments, for xSIB transmission without resource configuration based upon 5G Physical Downlink Control Channel (xPDCCH) transmissions, resource configuration may be derived from a 5G Primary Synchronization Signal (xPSS) transmission, or a 5G Secondary Synchronization Signal (xSSS) transmission, or a 5G Master Information Block (xMIB) via 5G Physical Broadcast Channel (xPBCH). Also discussed herein are scenarios for derivation of frequency resources and subframe type used for xSIB transmission for xPDCCH-less scenarios.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy eNB, a next-generation or 5G eNB, an mmWave eNB, an mmWave small cell, an AP, and/or another base station for a wireless communication system For purposes of the present disclosure, the term "UE" may refer to a UE, a 5G UE, an mmWave UE, an STA, and/or another mobile equipment for a wireless communication system Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

FIGS. 1-4 illustrate mechanisms for xSIB transmission with Tx beamforming. 5G Physical Downlink Shared Channel (xPDSCH) transmissions may be used to transmit xSIB.

Various kinds of xSIBs may carry different types of System Information (SI). AUE may need to decode part of an xSIB, for example an xSIB1 and/or an xSIB2, before transmitting an initial access message. AUE may decode an xSIB1 transmission first and may subsequently decode an xSIB2 transmission according to scheduling information indicated by the xSIB1. Other xSIB transmissions, e.g., xSIB3 through xSIB-N, may be decoded in a manner similar to xSIB2. In some embodiments, the xSIB transmissions described may include xSIB1 transmissions only.

In some embodiments, xSIB may be transmitted periodically through sweeping of Tx beams. An xSIB may also be transmitted in a subframe at a subframe offset or starting subframe. In some embodiments, the period and/or subframe offset for xSIB transmissions may be configured by various elements of the wireless communication network. In some embodiments, the period and/or subframe offset for xSIB transmissions may be configured by xMIB transmissions. In some embodiments, the period and/or subframe offset for xSIB transmissions may be configured by at least one of an xPSS transmission, an xSSS transmission, and/or a Beam Reference Signal (BRS) transmission.

FIG. 1 illustrates a periodic xSIB transmission, in accordance with some embodiments of the disclosure. A scenario 100 may comprise an xSIB transmission 111 for a first Tx beam, an xSIB transmission 121 for a second Tx beam, and so on, through an xSIB transmission 191 for an Nth Tx beam.

In scenario 100, a number N of Tx beams may be used for the xSIB transmissions. xSIBs may be transmitted on different Tx beams at a period 104, which may be K subframes. xSIB may also be transmitted at a subframe offset or starting subframe t.

The numbers N, K, and/or t may be configured in various ways. In some embodiments, the numbers N, K, and/or t may be configured by Radio Resource Control (RRC) from a primary cell (PCell). In some embodiments, the numbers N, K, and/or t may be carried in and/or configured by xMIB. In some embodiments, the numbers N, K, and/or t may be configured by and/or derived from xPSS, xSSS, and/or BRS.

In some embodiments, the number N may be calculated as a function of a number of BRS Resource Block (RB) resources as in equation 1 below:

$$N = \left\lceil \frac{N_{BRS} \times N_{sym}^{BRS}}{M} \right\rceil \qquad (1)$$

Where:
$N_{BRS}$ may denote a number of BRS RB resources;
$N_{sym}^{BRS}$ may refer to a number of symbols for BRS within one subframe; and
M may indicates a number of Tx beams to be aggregated (which may be configured by a wireless communications network, xMIB, xPSS, xSSS, and/or BRS).

In one exemplary embodiment, $N_{BRS}$ for an eNB may be 4, and the eNB may be operable to simultaneously transmit 4 beams (e.g., via 4 antenna panels, one or more of which may comprise an array of small antennas). Accordingly, for any given Orthogonal Frequency Division Multiplex (OFDM) symbol, the eNB may transmit beams in 4 directions at the same time. In the exemplary embodiment, $N_{sym}^{BRS}$ may be 12, and the eNB's resources may transmit by sweeping across Tx beams oriented in various directions over 12 symbols within a subframe. In the exemplary embodiment, M may be 4, and 4 Tx beams may be aggregated (e.g., for an xSIB transmission). For the exemplary embodiment, the number N of Tx beams used for the xSIB transmissions may accordingly be 12.

In some embodiments, in a "single frequency network" mode of operation, multiple eNBs may transmit an xSIB simultaneously at the same time and frequency resource (e.g., at the same resource element (RE) within an RB), which may advantageously gain the benefits of multi-site diversity. In some cases, N may be 1, and aggregated Tx beams may be applied on one or more xSIB transmissions.

Figure 2:
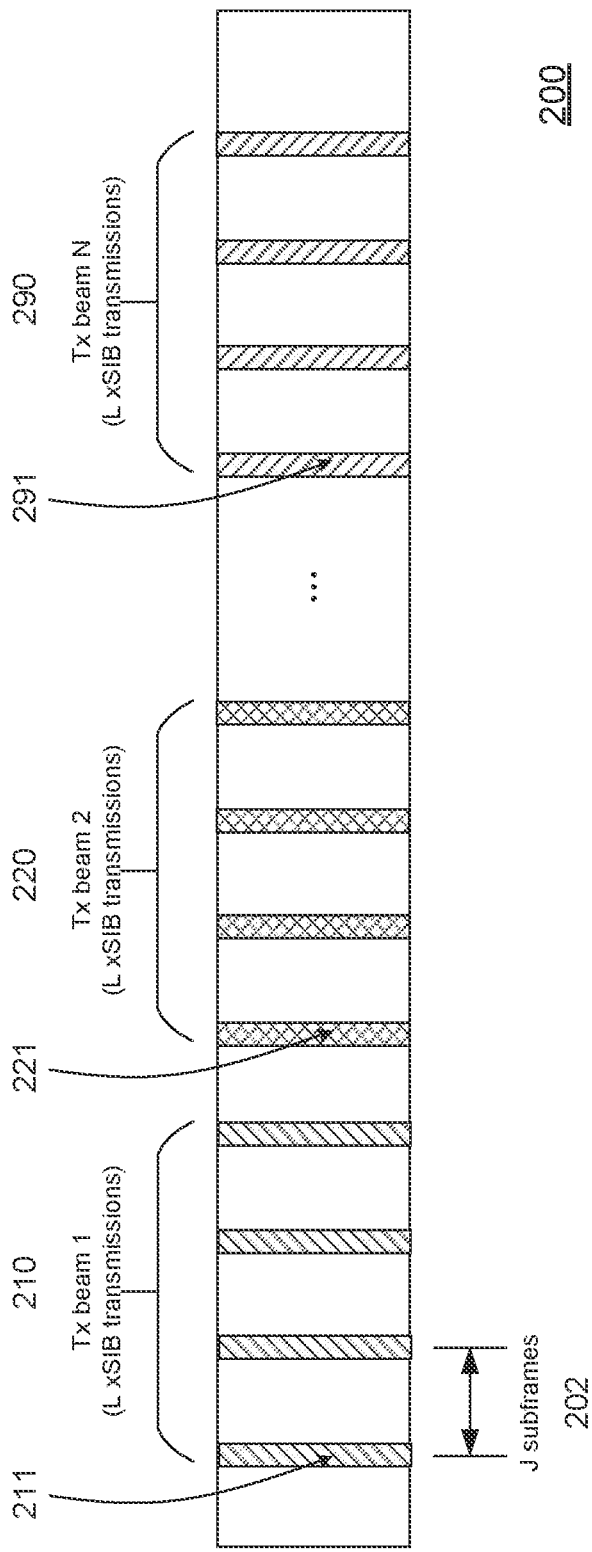
FIG. 2 illustrates periodic xSIB sequence transmission, in accordance with some embodiments of the disclosure.

FIG. 2 illustrates a periodic xSIB sequence transmission, in accordance with some embodiments of the disclosure. A scenario 200 may comprise a sequence 210 of a number L of xSIB transmissions for a first Tx beam, a sequence 220 of the number L of xSIB transmissions for a second Tx beam, and so on, through a sequence 290 of the number L of xSIB transmissions for an Nth Tx beam. Sequence 210 may comprise a first xSIB transmission 211 for the first Tx beam, sequence 220 may comprise a first xSIB transmission 221 for the second Tx beam, and sequence 290 may comprise a first xSIB transmission 291 for the Nth Tx beam. Within sequence 210, sequence 220, and/or other sequences of xSIB transmissions through sequence 290, a UE may expect the xSIB transmissions to be transmitted via the same Tx beam.

In scenario 200, a number of Tx beams N may be used for the xSIB transmissions. Within sequence 210, sequence 220, and/or other sequences of xSIB transmissions through sequence 290, the xSIB transmissions may be spaced by a period 202, which may be J subframes. The xSIB transmissions may also be transmitted at a subset offset or starting subframe t.

The numbers N, J, and/or t may be configured in various ways. In some embodiments, the numbers N, J, and/or t may be configured by a PCell (e.g. by RRC). In some embodiments, the numbers N, J, and/or t may be carried in and/or configured by xMIB. In some embodiments, the numbers N, J, and/or t may be configured by and/or derived from xPSS, xSSS, and/or BRS.

In some embodiments, for the L periodic xSIB transmissions within a sequence of xSIB transmissions, Chase Combining or Incremental Redundancy (IR) may be used. For embodiments using IR, different Redundancy Version (RV) patterns may be applied to improve decoding performance. In some embodiments, xSIB transmissions may use an RV pattern that may be predefined as [0 2 3 1], in accordance with, e.g., Release 12 of the 3GPP LTT specification (frozen 2011 Jun. 26). With the same Tx beams applied on the L periodic xSIB transmissions, a UE may perform IR (within a number P of transmissions) to improve detection performance.

In a manner that may be substantially similar to scenario 100, in some embodiments, in a "single frequency network" mode of operation, multiple eNBs may transmit an xSIB simultaneously at the same time and frequency resource (e.g., at the same resource element (RE) within an RB). In some such embodiments, aggregated Tx beams may be applied on each xSIB transmission, and RV pattern [0 2 3 I] may be applied to improve decoding performance.

Figure 3:
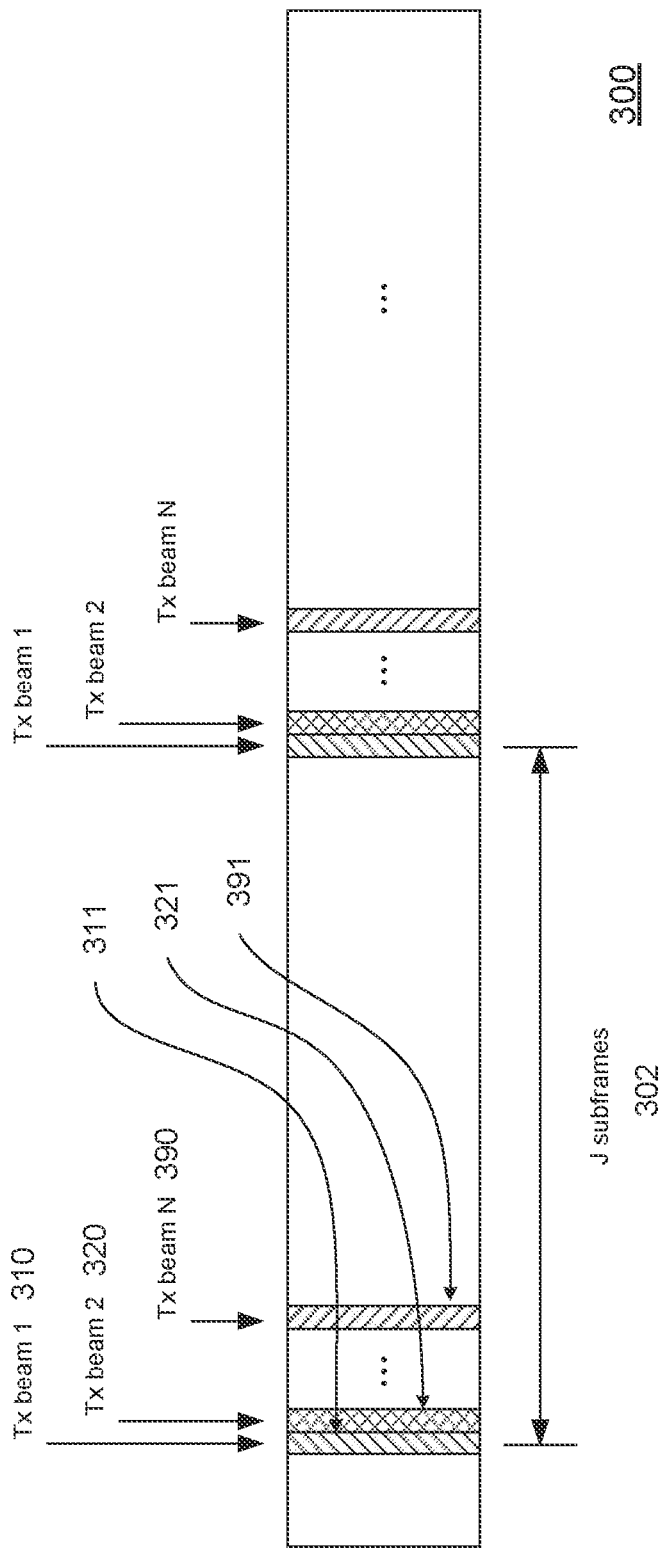
FIG. 3 illustrates a periodic interleaved consecutive xSIB sequence transmission, in accordance with some embodiments of the disclosure.

FIG. 3 illustrates a periodic interleaved consecutive xSIB sequence transmission, in accordance with some embodiments of the disclosure. A scenario 300 may comprise a sequence 310 of xSIB transmissions for a first Tx beam, a sequence 320 of xSIB transmissions for a second Tx beam, and so on, through a sequence 390 of xSIB transmissions for an Nth Tx beam Sequence 310 may comprise a first xSIB transmission 311 for the first Tx beam, sequence 320 may comprise a first xSIB transmission 321 for the second Tx beam, and sequence 390 may comprise a first xSIB transmission 391 for the Nth Tx beam The first xSIB transmissions of sequence 310, sequence 320, and/or other sequences of xSIB transmissions through sequence 390 may be transmitted in N consecutive symbols or subframes. Accordingly, first xSIB transmission 311 (of sequence 310, for the first Tx beam) may be transmitted in a first symbol or subframe, and first xSIB transmission 321 (of sequence 320, for the second Tx beam) may be transmitted in a second symbol or subframe, and so on, consecutively, through first xSIB transmission 391 (of sequence 390, for the Nth Tx beam), which may be transmitted in an Nth symbol or subframe. In addition, a UE may decode repeated xSIB transmissions together.

In scenario 300, a number of Tx beams N may be used for the xSIB transmissions. Within sequence 310, sequence 320, and/or other sequences of xSIB transmissions through sequence 390, the first xSIB transmission and the second xSIB transmission of the sequence may be spaced by a period 302, which may be a number J of subframes, for which J may be larger than N. The xSIB transmissions may also be transmitted at a subset offset or starting subframe t.

The numbers N, J, and/or t may be configured in various ways. In some embodiments, the numbers N, J, and/or t may be configured by a PCell (e.g. by RRC). In some embodiments, the numbers N, J, and/or t may be carried in and/or configured by xMIB. In some embodiments, the numbers N, J, and/or t may be configured by and/or derived from xPSS, xSSS, and/or BRS.

Figure 4:
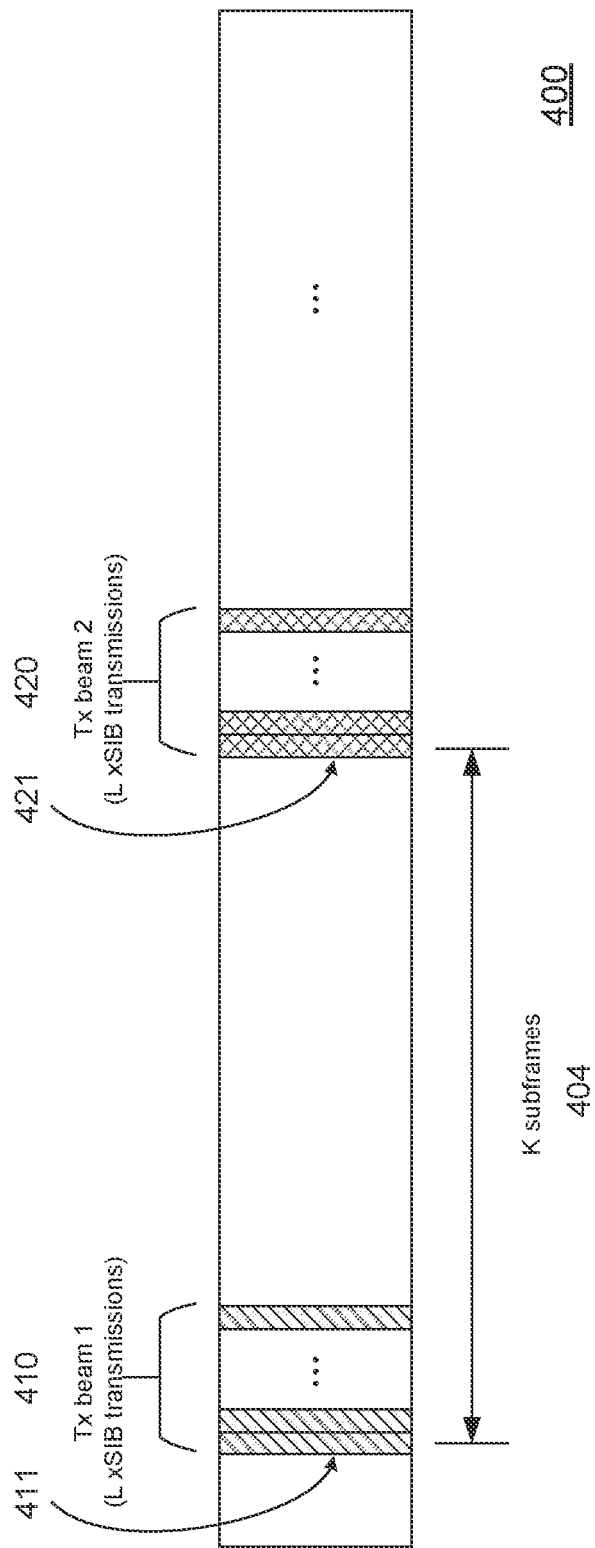
FIG. 4 illustrates a periodic non-interleaved consecutive xSIB sequence transmission, in accordance with some embodiments of the disclosure.

FIG. 4 illustrates a periodic non-interleaved consecutive xSIB sequence transmission, in accordance with some embodiments of the disclosure. A scenario 400 may comprise a sequence 410 of a number L of xSIB transmissions for a first Tx beam, a sequence 420 of the number L of xSIB transmissions for a second Tx beam, and so on, through a sequence of the number of L xSIB transmissions for an Nth Tx beam Sequence 410 may comprise a first xSIB transmission 411 for the first Tx beam, sequence 420 may comprise a first xSIB transmission 421 for the second Tx beam, and the sequence of xSIB transmissions for the Nth Tx beam may comprise a first xSIB transmission for the Nth Tx beam In addition, a predetermined or configured RV pattern may be employed to improve decoding performance.

Within sequence 410, sequence 420, and/or other sequences of xSIB transmissions through the sequence for the Nth Tx beam, the L xSIB transmissions of each sequence may be transmitted in L consecutive symbols or subframes. Accordingly, first xSIB transmission 411 of sequence 410 may be transmitted in a first symbol or subframe, and a second xSIB transmission of sequence 410 may be transmitted in a second symbol or subframe, and so on, consecutively, through an Lth xSIB transmission of sequence 410, which may be transmitted in an Lth symbol or subframe.

In scenario 400, a number of Tx beams N may be used for the xSIB transmissions. Within sequence 410, sequence 420, and/or other sequences of xSIB transmissions through the Nth sequence, the first xSIB transmissions of each sequences may be spaced from each other by a period 404, which may be K subframes, and K may be larger than N. The xSIB transmissions may also be transmitted at a subset offset or starting subframe t.

With reference to FIGS. 1-4, in some embodiments, Tx beam information for an xSIB transmission may be derived from a Tx beam applied on an xMIB transmission or a BRS transmission. Based upon that information, a UE may decide which subframe in which to decode an xSIB. A number k (for which k E [1, N]) may be denoted as an index of an xSIB targeted for decoding, and may be indicated by BRS information as in equation 2 below:

$$k = f(N_{ID}^{BRS}, I_{BRS}) \qquad (2)$$

Where:

f( ) may be a mapping function (which may be defined by the network);

$N_{ID}^{BRS}$ may indicate an ID of a BRS sequence in which a maximum BRS Receiving Power (BRS-RP) may be measured by a UE; and $I_{BRS}$ may denote an RB group index for the BRS (which may define a relationship between two or more of an OFDM symbol for a BRS transmission, an RB group index for the BRS transmission, and a Tx beam index for xSIB transmission).

An exemplary mapping function f( ) may result in equation 3 below (where N/y may refer to a number of symbols for BRS within one subframe, as in equation 1 above).

$$k = \left\lceil \frac{I_{BRS} \times N_{sym}^{BRS} + (N_{ID}^{BRS} \bmod N_{sym}^{BRS})}{M} \right\rceil \qquad (3)$$

AUE may derive a periodic subframe which may contain an xSIB transmission for safe decoding based on the above equations and relationships. For example, k may indicate an index of a symbol or subframe in which a UE may expect an xSIB transmission for a particular Tx beam. The UE may accordingly target to decode the expected xSIB transmission at a subframe corresponding to the index k.

Figure 5:
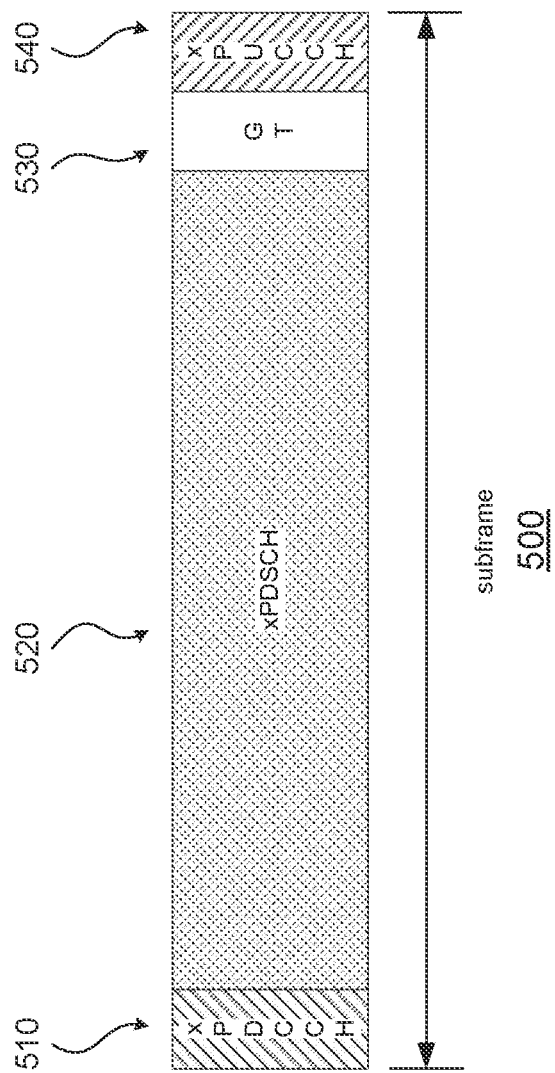
FIG. 5 illustrates a self-contained Time Division Duplex (TDD) subframe structure, in accordance with some embodiments of the disclosure.

FIG. 5 illustrates a self-contained Time Division Duplex (TDD) subframe structure, in accordance with some embodiments of the disclosure. To enable low-latency transmissions, a self-contained TDD subframe structure may be used for a 5G system A Hybrid Automatic Repeat Request (HARQ) acknowledgement (ACK)|negative-acknowledgement (NACK) feedback may be transmitted in a subframe in which an xPDSCH is scheduled.

In FIG. 5, a subframe 500 may comprise an xPDCCH transmission 510, an xPDSCH transmission 520, a guard time 530, and a 5G Physical Uplink Control Channel (xPUCCH) transmission 540. xPDSCH transmission 520 may be scheduled by xPDCCH transmission 510, and may be transmitted immediately subsequent to xPDCCH transmission 510. AUE may decode xPDSCH transmission 520, after which the UE may provide an ACK or NACK as feedback in xPUCCH transmission 540. In some embodiments, a guard time 530 may be present between xPDSCH transmission 520 and xPUCCH transmission 540 in order to accommodate DL-to-UL and/or UL-to-DL switching times and/or round-trip propagation delays.

With reference to FIGS. 1-5, xSIB transmissions may be scheduled in a variety of ways. In some embodiments, xSIB transmissions may be scheduled via xPDCCH transmissions. A Downlink Control Information (DCI) format with DL assignment may include a Modulation and Coding Scheme (MCS) indicator, an RB assignment indicator, and/or one or more others indicators. The xPDCCH transmission and the subsequent xPDSCH transmission carrying an xSIB may be transmitted by the same Tx beam In some embodiments, an xPDCCH transmission may be used to transmit the DCI for other, common information, such as paging, RAR, power control commands, and/or some DE-specific DCI. Moreover, in cases in which Tx beam sweeping may be applied for xPDCCH transmissions with common search space, repeated transmissions may be advantageous, but may increase system overhead and thereby reduce spectrum efficiency.

Accordingly, in some embodiments, xPDCCH-less operation for xSIB transmission may reduce system overhead and reserve more beam resources for other messages (e.g., UE specific DCI). For xPDCCH-less operation, information regarding resource allocation and MCS may be made available at a UE (e.g., a Machine-Type Communication (MTC) UE) in order to facilitate proper decoding of common control channels. The configuration of the resource allocation may include various parameters, such as:

- a bitmap of subframes used for xSIB transmission;
- a starting subframe (e.g., with respect to a System Frame Number (SFN) 0 of the transmitting cell and/or a period of the xSIB);
- a frequency location of an xSIB transmission;
- a configuration of an xSIB transmission (e.g., a number of repeated subframes, a type (e.g. Chase Combining or Incremental Redundancy), and/or an RV pattern used for xSIB transmission);
- a parameter for frequency hopping (e.g., a frequency hopping enable, or a frequency hopping pattern);
- a starting ODFM symbol for xSIB transmission; an xPDSCH duration for xSIB transmission;
- a duration of xPUCCH transmission; and/or
- a configuration parameter (e.g., an xPUCCH presence indicator for the subframe in xSIB transmission).

In some embodiments, various resource allocation parameters may be predetermined, e.g., by being defined in a specification. For example, a time instance for xSIB transmission may be fixed by specification (e.g., every subframe number 5 within a 20 millisecond period). For some embodiments, one or more resource allocation parameters and/or an MCS of an xSIB transmission may be configured by higher layers via RRC signaling from a PCell.

In some embodiments, one or more resource allocation parameters and/or an MCS may be carried in an xMIB transmission. For example, a limited set of MCS and frequency locations used for xSIB transmission may be defined by specification. One or more fields of an xMIB transmission may indicate one or more combinations of MCS and frequency locations that may be applied for xSIB transmission.

For some embodiments, one or more resource allocation parameters and/or an MCS of an xSIB transmission may be derived from xPSS, xSSS, and/or BRS. For example, a frequency location used for xSIB transmission may be defined as a function of cell ID, virtual cell ID, BRS group ID, SFN, subframe index, and/or slot index. In another example, a set of possible frequency resources for xSIB transmission may be predefined or configured in an xMIB transmission. Furthermore, an exact frequency resource used for xSIB transmission may be derived from this set of possible frequency resources according to a function of physical cell ID and/or subframe index.

In one example, a frequency resource index/freq may be generically defined in accordance with equation 4 below:

$$I_{freq} = (c_0 \cdot N_{cell}^{ID} + c_1 \cdot n_{SF} + c_2) \mod K_{freq} \quad (4)$$

Where:
- $c_0, c_1, c_2$ may be constants (which may be, e.g., predefined in the specification, or configured by higher layers via xMIB);
- $N_{Cell}^{ID}$ may be a physical cell ID;
- $n_{SF}$ may be a subframe index;
- mod may be a modulo operation; and
- $K_{freq}$ may be frequency resources configured in an xMIB (e.g., a number of frequency resources).

In some embodiments, one or more of the above-described methods may be combined to indicate resource allocation parameters and/or MCS of an xSIB transmission.

Figure 6:
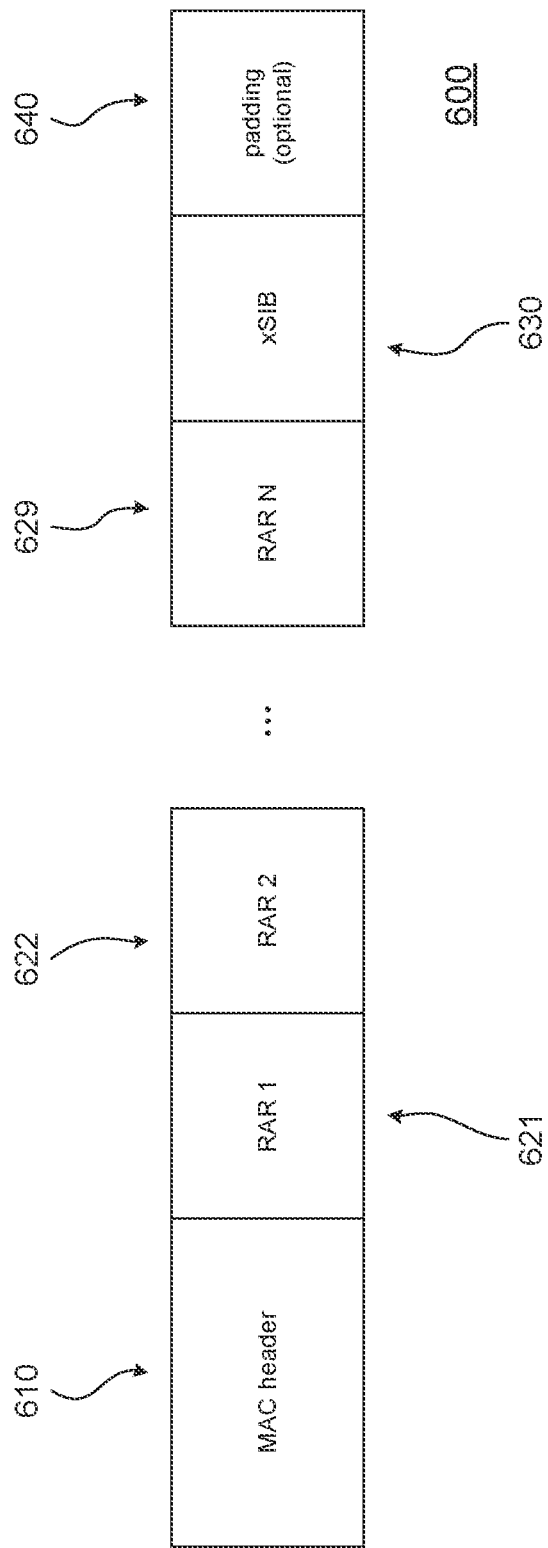
FIG. 6 illustrates a Media Access Control (MAC) Protocol Data Unit (POU) for Random Access Response (RAR) and xSIB, in accordance with some embodiments of the disclosure.

FIG. 6 illustrates a Media Access Control (MAC) Protocol Data Unit (PDU) for Random Access Response (RAR) and xSIB, in accordance with some embodiments of the disclosure. A MAC PDU 600 may comprise a MAC header 610, a first RAR 621, a second RAR 622, additional RARs through an Nth RAR 629, an xSIB 630, and/or an optional padding 640.

For some embodiments, xSIB may be transmitted after a 5G Physical Random Access Channel (xPRACH) transmission and may be associated with RAR. MAC header 610 may be an independent xSIB MAC header, and may be used to indicate the xSIB transmission, in which a new Logical Channel ID (LCID) denoting the xSIB transmission may be used. A UE may decode one or more RARs (e.g., of first RAR 621 through Nth RAR 629) and/or xSIB 630 of MAC DPU 600. For an RRC connected UE, if information in an xSIB (e.g., xSIB 630) changes, an eNB may transmit the changed information to one or more active UEs (and potentially to all active UEs) via MAC PDU 600, with an SI Radio Network Temporary Identifier (RNTI) by xPDSCH in several subframes.

Figure 7:
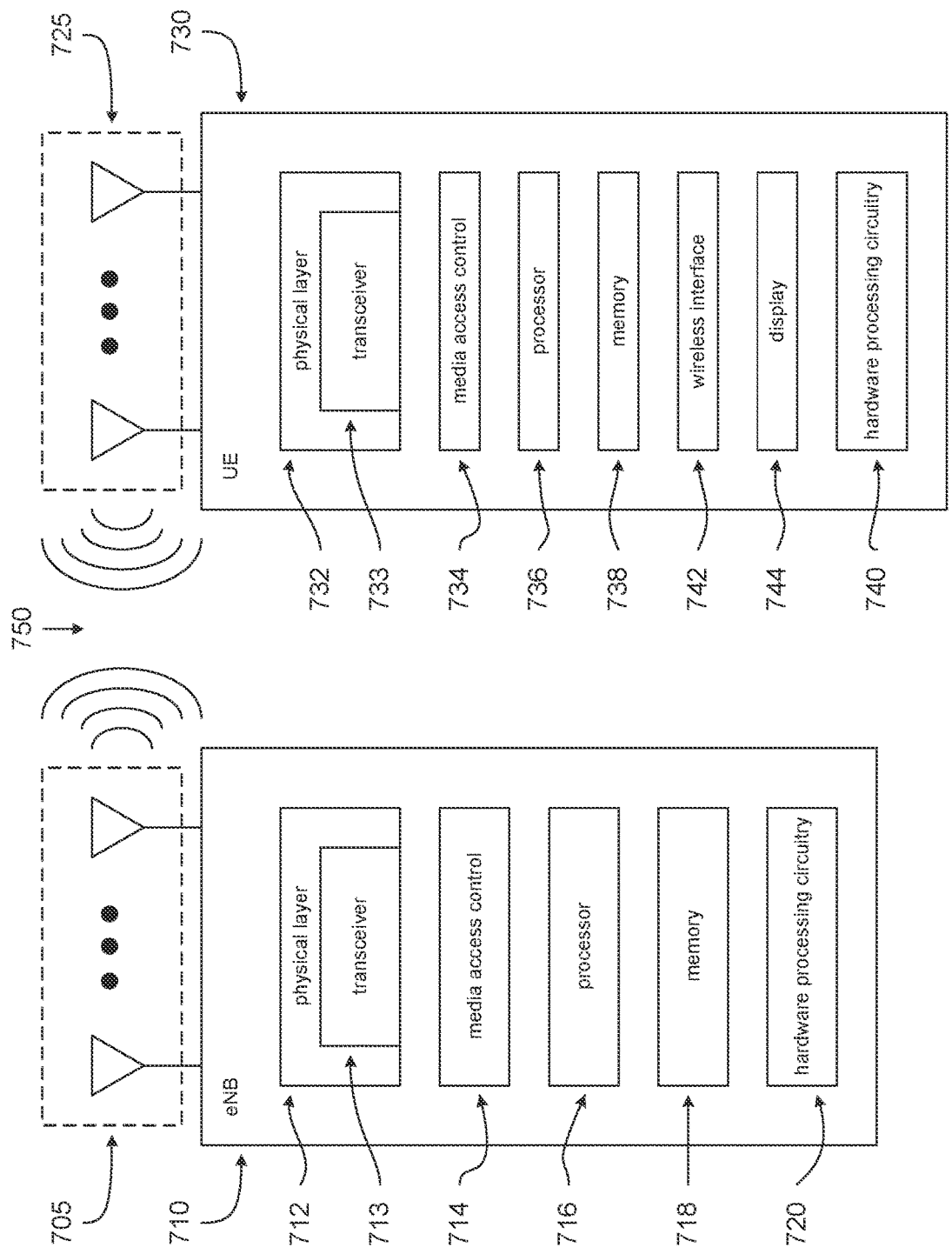
FIG. 7 illustrates a 5G Evolved Node B (eNB) and a 5G User Equipment (UE), in accordance with some embodiments of the disclosure.

FIG. 7 illustrates a 5G eNB and a 5G UE, in accordance with some embodiments of the disclosure. FIG. 7 includes block diagrams of an eNB 710 and a UE 730 which are operable to co-exist with each other and other elements of an LTE network. High-level, simplified architectures of eNB 710 and UE 730 are described so as not to obscure the embodiments. It should be noted that in some embodiments, eNB 710 may be a stationary non-mobile device.

eNB 710 is coupled to one or more antennas 705, and UE 730 is similarly coupled to one or more antennas 725. However, in some embodiments, eNB 710 may incorporate or comprise antennas 705, and UE 730 in various embodiments may incorporate or comprise antennas 725

In some embodiments, antennas 705 and/or antennas 725 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 705 are separated to take advantage of spatial diversity.

eNB 710 and UE 730 are operable to communicate with each other on a network, such as a wireless network. eNB 710 and UE 730 may be in communication with each other over a wireless communication channel 750, which has both a downlink path from eNB 710 to UE 730 and an uplink path from UE 730 to eNB 710.

As illustrated in FIG. 7, in some embodiments, eNB 710 may include a physical layer circuitry 712, a MAC (media access control) circuitry 714, a processor 716, a memory 718, and a hardware processing circuitry 720. A person skilled in the art will appreciate that other components not shown may be used in addition to the components shown to form a complete eNB.

In some embodiments, physical layer circuitry 712 includes a transceiver 713 for providing signals to and from UE 730. Transceiver 713 provides signals to and from UEs or other devices using one or more antennas 705. In some embodiments, MAC circuitry 714 controls access to the wireless medium Memory 718 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 720 may comprise logic devices or circuitry to perform various operations. In some embodiments, processor 716 and memory 718 are arranged to perform the operations of hardware processing circuitry 720, such as operations described herein with reference to logic devices and circuitry within eNB 710 and/or hardware processing circuitry 720.

Accordingly, in some embodiments, eNB 710 may be a device comprising an application processor, a memory, one or more antenna ports, and an interface for allowing the application processor to communicate with another device.

As is also illustrated in FIG. 7, in some embodiments, UE 730 may include a physical layer circuitry 732, a MAC circuitry 734, a processor 736, a memory 738, a hardware processing circuitry 740, a wireless interface 742, and a display 744. A person skilled in the art would appreciate that other components not shown may be used in addition to the components shown to form a complete UE.

In some embodiments, physical layer circuitry 732 includes a transceiver 733 for providing signals to and from eNB 710 (as well as other eNBs). Transceiver 733 provides signals to and from eNBs or other devices using one or more antennas 725. In some embodiments, MAC circuitry 734 controls access to the wireless medium Memory 738 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 742 may be arranged to allow the processor to communicate with another device. Display 744 may provide a visual and/or tactile display for a user to interact with UE 730, such as a touch-screen display. Hardware processing circuitry 740 may comprise logic devices or circuitry to perform various operations In some embodiments, processor 736 and memory 738 may be arranged to perform the operations of hardware processing circuitry 740, such as operations described herein with reference to logic devices and circuitry within UE 730 and/or hardware processing circuitry 740.

Accordingly, in some embodiments, UE 730 may be a device comprising an application processor, a memory, one or more antennas, a wireless interface for allowing the application processor to communicate with another device, and a touch-screen display.

Elements of FIG. 7, and elements of other figures having the same names or reference numbers, can operate or function in the manner described herein with respect to any such figures (although the operation and function of such elements is not limited to such descriptions). For example, FIGS. 8 and 11 also depict embodiments of eNBs, hardware processing circuitry of eNBs, UEs, and/or hardware processing circuitry of UEs, and the embodiments described with respect to FIG. 7 and FIGS. 8 and 11 can operate or function in the manner described herein with respect to any of the figures.

In addition, although eNB 710 and UE 730 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

An eNB may include various hardware processing circuitries discussed below (such as hardware processing circuitry 800 of FIG. 8), which may in turn comprise logic devices and/or circuitry operable to perform various operations. For example, with reference to FIG. 7, eNB 710 (or various elements or components therein, such as hardware processing circuitry 720, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 716 (and/or one or more other processors which eNB 710 may comprise), memory 718, and/or other elements or components of eNB 710 (which may include hardware processing circuitry 720) may be arranged to perform the operations of these hardware processing circuitries, such as operations described herein with reference to devices and circuitry within these hardware processing circuitries. In some embodiments, processor 716 (and/or one or more other processors which eNB 710 may comprise) may be a baseband processor.

Figure 8:
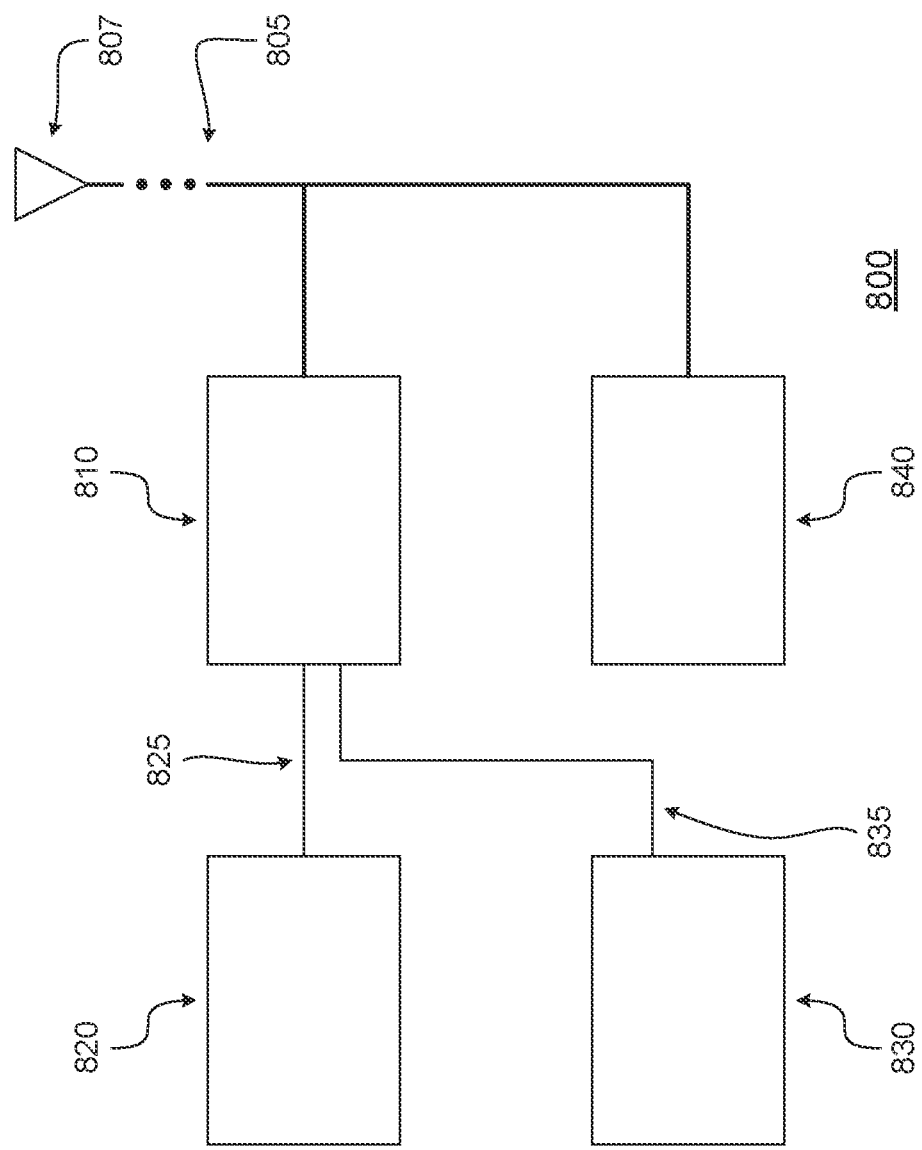
FIG. 8 illustrates hardware processing circuitries for a 5G eNB for xSIB transmission with Tx beamforming, in accordance with some embodiments of the disclosure.

FIG. 8 illustrates hardware processing circuitries for a 5G eNB for xSIB transmission with Tx beamforming, in accordance with some embodiments of the disclosure. An apparatus of eNB 710 (or another eNB or base station), which may be operable to communicate with one or more UEs on a wireless network, may comprise hardware processing circuitry 800. In some embodiments, hardware processing circuitry 800 may comprise one or more antenna ports 805 operable to provide various transmissions over a wireless communication channel (such as wireless communication channel 750). Antenna ports 805 may be coupled to one or more antennas 807 (which may be antennas 705). In some embodiments, hardware processing circuitry 800 may incorporate antennas 807, while in other embodiments, hardware processing circuitry 800 may merely be coupled to antennas 807.

Antenna ports 805 and antennas 807 may be operable to provide signals from an eNB to a wireless communications channel and/or a UE, and may be operable to provide signals from a UE and/or a wireless communications channel to an eNB. For example, antenna ports 805 and antennas 807 may be operable to provide transmissions from eNB 710 to wireless communication channel 750 (and from there to UE 730, or to another UE). Similarly, antennas 807 and antenna ports 805 may be operable to provide transmissions from a wireless communication channel 750 (and beyond that, from UE 730, or another UE) to eNB 710.

With reference to FIG. 8, hardware processing circuitry 800 may comprise a first circuitry 810, a second circuitry 820, a third circuitry 830, and a fourth circuitry 840. In some embodiments, first circuitry 810 may be operable to generate one or more xPDSCH transmissions. Second circuitry 820 may be operable to arrange the one or more xPDSCH transmissions for transmission through one or more respectively corresponding Tx beams. Second circuitry 820 may provide the arrangement to first circuitry 810 vi an interface 825. The one or more xPDSCH transmissions carry one or more respectively corresponding xSIBs.

For some embodiments, second circuitry 820 may be operable to arrange the one or more xPDSCH transmissions for transmission sweeping across the Tx beams in one or more respectively corresponding subframes periodically spaced by a number K of subframes. In some embodiments, the one or more xPDSCH transmissions may be first xPDSCH transmissions of one or more respectively corresponding sequences of a number L of xPDSCH transmissions carrying xSIBs, and second circuitry 820 may be operable to arrange the one or more sequences of xPDSCH transmissions respectively for transmission through the one or more Tx beams. In some such embodiments, the xPDSCH transmissions for a sequence of xPDSCH transmissions may be arranged for transmission in subframes periodically spaced by a number J of subframes.

For some embodiments, the first xPDSCH transmissions of the sequences of xPDSCH transmissions may be arranged for transmission in L consecutive symbols or subframes. In some such embodiments, the number J may be greater than the number of Tx beams. In some embodiments, the xPDSCH transmissions for a sequence of xPDSCH transmissions may be arranged for transmission in L consecutive symbols or subframes. For some embodiments, the xPDSCH transmissions for a sequence of xPDSCH transmissions may be generated in accordance with one of: a Chase Combining technique, or a Redundancy Version technique using a predetermined Redundancy Version pattern. In some embodiments, at least one of a starting subframe, a subframe offset for one of the Tx beams, and the number K may be configured by one of: a 5G Master Information Block, a 5G Primary Synchronization Signal, a 5G Secondary Synchronization Signal, or a 5G Beam Reference Signal.

In some embodiments, first circuitry 810 may be operable to generate one or more xPDSCH transmissions carrying one or more xSIBs for transmission through one or more Tx beams. For some such embodiments, third circuitry 830 may be operable to schedule the one or more xPDSCH transmissions in accordance with a resource allocation having one or more parameters. Third circuitry 830 may provide the schedule to first circuitry 810 via an interface 835.

For some embodiments, the resource allocation parameters may comprise one or more of: a bitmap of subframes used for xSIB transmission, a starting subframe for xSIB transmission with respect to a System Frame Number zero of a transmitting cell, a periodicity of xSIB transmission, a frequency location of xSIB transmission, a configuration of xSIB transmission including a number of repeated subframes, a Chase Combining xSIB transmission type indicator, an Incremental Redundancy xSIB transmission type indicator, a Redundancy Version pattern for xSIB transmission, a frequency hopping enable indicator, a frequency hopping pattern, a starting OFDM symbol of xSIB transmission, and an xPDSCH duration for xSIB transmission.

In some embodiments, fourth circuitry 840 may be operable to process an xPDCCH transmission. In some such embodiments, the one or more xPDSCH transmissions may be scheduled by the xPDCCH transmission.

For some embodiments, at least one of the resource allocation parameters and an MCS of the xPDSCH transmissions carrying xSIB may have predetermined values. In some embodiments, at least one of the resource allocation parameters and an MCS of the xPDSCH transmissions carrying xSIB may be carried in an xMIB. For some embodiments, at least one of the resource allocation parameters and an MCS of the xPDSCH transmissions carrying xSIB may be derived from one or more of: an xPSS, an xSSS, and a BRS. In some such embodiments, a frequency location used for xPDSCH transmissions carrying xSIB may be defined as a function of at least one of: cell ID, virtual cell ID, BRS group ID, system frame number, subframe index and slot index.

In some embodiments, fourth circuitry 840 may be operable to process an xPRACH transmission. In some such embodiments, the xPDSCH transmissions carrying xSIB may be associated with a RAR transmission, and may be transmitted after processing the xPRACH transmission.

In some embodiments, first circuitry 810, second circuitry 820, third circuitry 830, and fourth circuitry 840 may be implemented as separate circuitries. In other embodiments, one or more of first circuitry 810, second circuitry 820, third circuitry 830, and fourth circuitry 840 may be combined and implemented together in a circuitry without altering the essence of the embodiments.

Figure 9:
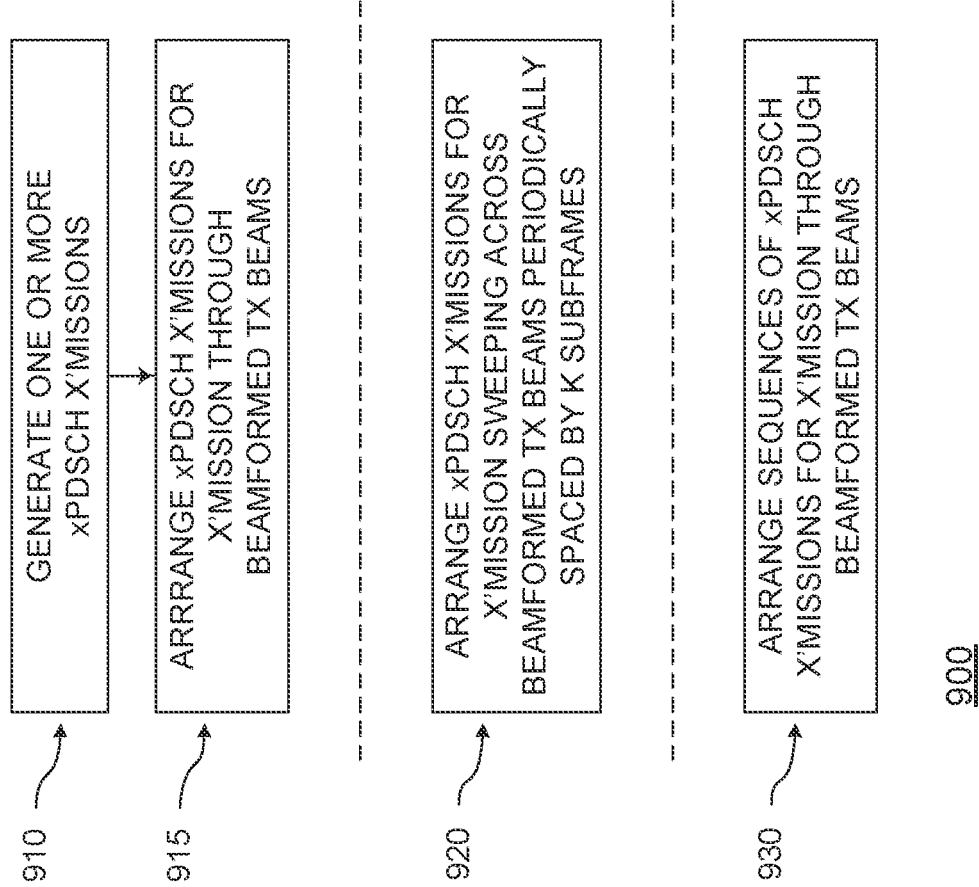
FIG. 9 illustrates methods for a 5G eNB for xSIB transmission with Tx beamforming, in accordance with some embodiments of the disclosure.

FIG. 9 illustrates methods for a 5G eNB for xSIB transmission with Tx beamforming, in accordance with some embodiments of the disclosure. A method 900 may comprise a generating 910, an arranging 915, an arranging 920, and/or an arranging 930.

In generating 910, one or more xPDSCH transmissions may be generated. In arranging 915, the one or more xPDSCH transmissions may be arranged for transmission through one or more respectively corresponding Tx beams. The one or more xPDSCH transmissions may carry one or more respectively corresponding xSIBs.

In some embodiments, in arranging 920, the one or more xPDSCH transmissions may be arranged for transmission sweeping across the Tx beams in one or more respectively corresponding subframes periodically spaced by a number K of subframes. For some embodiments, the one or more xPDSCH transmissions are first xPDSCH transmissions of one or more respectively corresponding sequences of a number L of xPDSCH transmissions carrying xSIBs. In some such embodiments, in arranging 930, the one or more sequences of xPDSCH transmissions may be arranged respectively for transmission through the one or more Tx beams. For some such embodiments, the xPDSCH transmissions for a sequence of xPDSCH transmissions may be arranged for transmission in subframes periodically spaced by a number J of symbols or subframes.

In some embodiments, the first xPDSCH transmissions of the sequences of xPDSCH transmissions may be arranged for transmission in L consecutive symbols or subframes. In some such embodiments, the number J may be greater than the number of Tx beams.

For some embodiments, the xPDSCH transmissions for a sequence of xPDSCH transmissions may be arranged for transmission in L consecutive symbols or subframes. In some embodiments, the xPDSCH transmissions for a sequence of xPDSCH transmissions may be generated in accordance with one of: a Chase Combining technique, or a Redundancy Version technique using a predetermined Redundancy Version pattern. For some embodiments, at least one of a starting subframe, a subframe offset for one of the Tx beams, and the number K may be configured by one of: a 5G Master Information Block, a 5G Primary Synchronization Signal, a 5G Secondary Synchronization Signal, or a 5G Beam Reference Signal.

Figure 10:
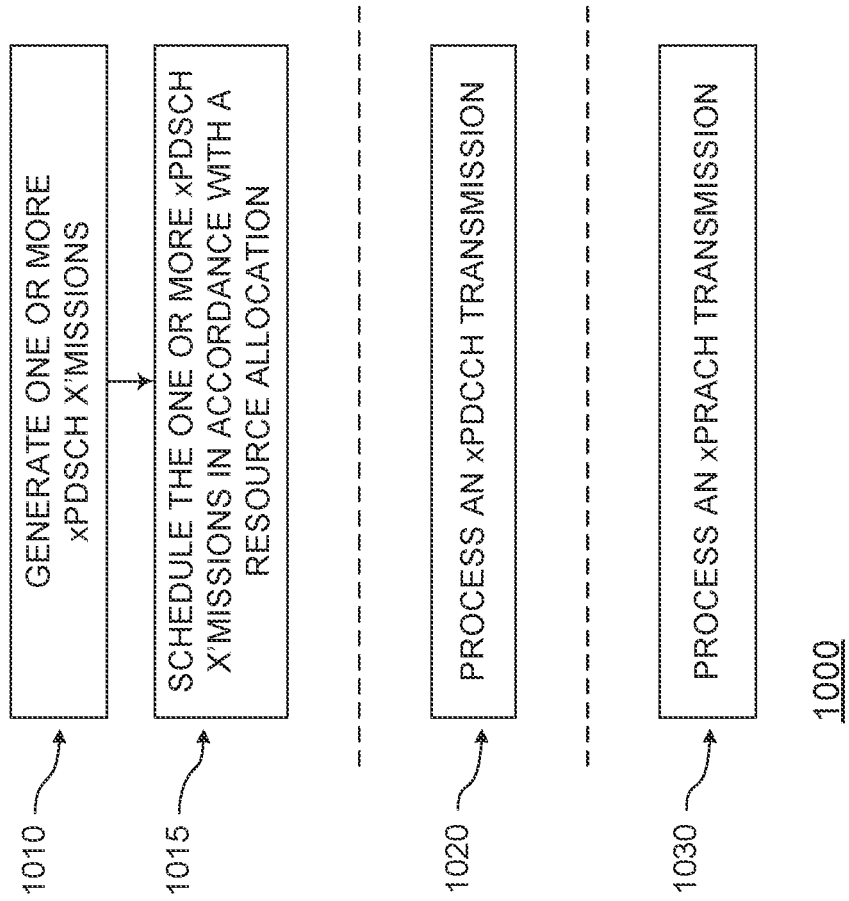
FIG. 10 illustrates methods for a 5G eNB for xSIB transmission with Tx beamforming, in accordance with some embodiments of the disclosure.

FIG. 10 illustrates methods for a 5G eNB for DESCRIPTION, in accordance with some embodiments of the disclosure. A method 1000 may comprise a generating 1010, a scheduling 1015, a processing 1020, and/or a processing 1030.

In some embodiments, in generating 1010, one or more xPDSCH transmissions carrying one or more xSIBs may be generated for transmission through one or more Tx beams. In some such embodiments, in scheduling 1015, the one or more xPDSCH transmissions may be scheduled in accordance with a resource allocation having one or more parameters.

For some embodiments, the resource allocation parameters may comprise one or more of: a bitmap of subframes used for xSIB transmission, a starting subframe for xSIB transmission with respect to a System Frame Number zero of a transmitting cell, a periodicity of xSIB transmission, a frequency location of xSIB transmission, a configuration of xSIB transmission including a number of repeated subframes, a Chase Combining xSIB transmission type indicator, an Incremental Redundancy xSIB transmission type indicator, a Redundancy Version pattern for xSIB transmission, a frequency hopping enable indicator, a frequency hopping pattern, a starting OFDM symbol of xSIB transmission, and an xPDSCH duration for xSIB transmission.

In some embodiment, in processing 1020, a xPDCCH transmission may be processed. In some such embodiments, the one or more xPDSCH transmissions may be scheduled by the xPDCCH transmission.

For some embodiments, at least one of the resource allocation parameters and an MCS of the xPDSCH transmissions carrying xSIB have predetermined values. In some embodiments, at least one of the resource allocation parameters and an MCS of the xPDSCH transmissions carrying xSIB may be carried in an xMIB. For some embodiments, at least one of the resource allocation parameters and an MCS of the xPDSCH transmissions carrying xSIB may be derived from one or more of: an xPSS, an xSSS, and a BRS. In some such embodiments, a frequency location may be used for xPDSCH transmissions carrying xSIB are defined as a function of at least one of: cell ID, virtual cell ID, BRS group ID, system frame number, subframe index, and slot index.

For some embodiments, in processing 1030, xPRACH transmission may be processed. In some such embodiments, the xPDSCH transmissions carrying xSIB may be associated with a RAR transmission, and may be transmitted after processing the xPRACH transmission.

Although the actions in flowcharts 900 and 1000 with reference to FIGS. 9 and 10 are shown in a particular order, the order of the actions can be modified. Thus, the illustrated embodiments can be performed in a different order, and some actions may be performed in parallel. Some of the actions and/or operations listed in FIGS. 9 and 10 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 710 and/or hardware processing circuitry 720 to perform an operation comprising the methods of FIGS. 9 and 10. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 9 and 10.

Figure 11:
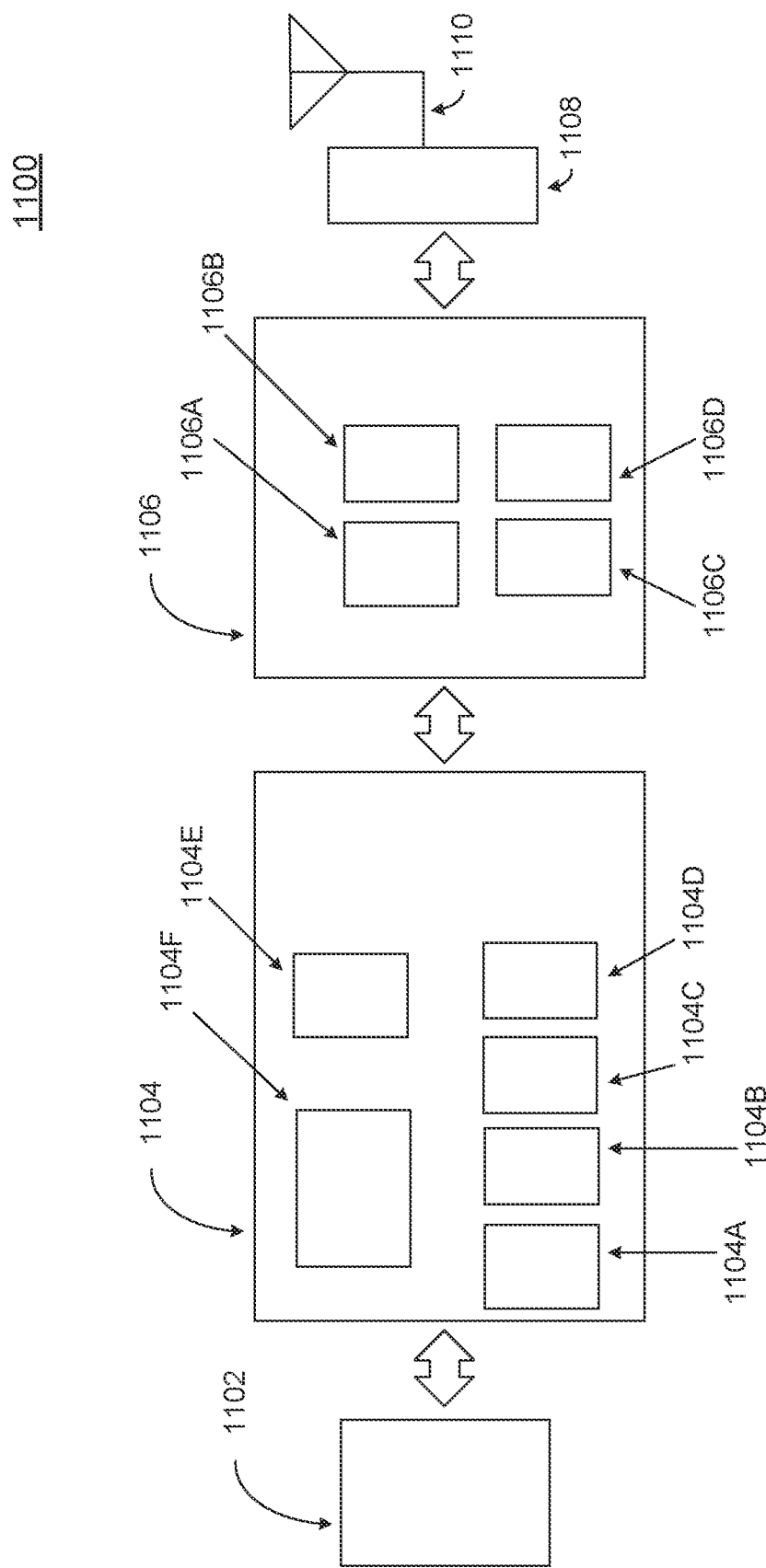
FIG. 11 illustrates example components of a UE device, in accordance with some embodiments of the disclosure.

FIG. 11 illustrates example components of a UE device 1100, in accordance with some embodiments of the disclosure. In some embodiments, the UE device 1100 may include application circuitry 1102, baseband circuitry 1104, Radio Frequency (RF) circuitry 1106, front-end module (FEM) circuitry 1108, a low-power wake-up receiver (LP-WUR), and one or more antennas 1110, coupled together at least as shown. In some embodiments, the UE device 1100 may include additional elements such as, for example, memory/storage, display, camera, sensor, and/or input/output (I/O) interface.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104A, third generation (3G) baseband processor 1104B, fourth generation (4G) baseband processor 1104C, and/or other baseband processor(s) 1104D for other existing generations, generations in development or to be developed in the future (e.g., fifth generation (5G), 6G, etc.). The baseband circuitry 1104 (e.g., one or more of baseband processors 1104A-D) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU)

1104E of the baseband circuitry 1104 may be configured to run elements of the protocol stack for signaling of the PHY, MAC, RLC, PDCP and/or RRC layers. In some embodiments, the baseband circuitry may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106A, amplifier circuitry 1106B and filter circuitry 1106C. The transmit signal path of the RF circuitry 1106 may include filter circuitry 1106C and mixer circuitry 1106A. RF circuitry 1106 may also include synthesizer circuitry 1106D for synthesizing a frequency for use by the mixer circuitry 1106A of the receive signal path and the transmit signal path. In some embodiments, the mixer circuitry 1106A of the receive signal path may be configured to down-convert RF signals received from the FEM circuitry 1108 based on the synthesized frequency provided by synthesizer circuitry 1106D. The amplifier circuitry 1106B may be configured to amplify the down-converted signals and the filter circuitry 1106C may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106A of the receive signal path may comprise passive mixers, although the scope of the embodiments is not limited in this respect.

In some embodiments, the mixer circuitry 1106A of the transmit signal path may be configured to up-convert input baseband signals based on the synthesized frequency provided by the synthesizer circuitry 1106D to generate RF output signals for the FEM circuitry 1108. The baseband signals may be provided by the baseband circuitry 1104 and may be filtered by filter circuitry 1106C. The filter circuitry 1106C may include a low-pass filter (LPF), although the scope of the embodiments is not limited in this respect.

In some embodiments, the mixer circuitry 1106A of the receive signal path and the mixer circuitry 1106A of the transmit signal path may include two or more mixers and may be arranged for quadrature down-conversion and/or up-conversion respectively. In some embodiments, the mixer circuitry 1106A of the receive signal path and the mixer circuitry 1106A of the transmit signal path may include two or more mixers and may be arranged for image rejection (e.g., Hartley image rejection). In some embodiments, the mixer circuitry 1106A of the receive signal path and the mixer circuitry 1106A may be arranged for direct down-conversion and/or direct up-conversion, respectively. In some embodiments, the mixer circuitry 1106A of the receive signal path and the mixer circuitry 1106A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106D may be a fractional-N synthesizer or a fractional NIN+1 synthesizer, although the scope of the embodiments is not limited in this respect as other types of frequency synthesizers may be suitable. For example, synthesizer circuitry 1106D may be a delta-sigma synthesizer, a frequency multiplier, or a synthesizer comprising a phase-locked loop with a frequency divider.

The synthesizer circuitry 1106D may be configured to synthesize an output frequency for use by the mixer circuitry 1106A of the RF circuitry 1106 based on a frequency input and a divider control input. In some embodiments, the synthesizer circuitry 1106D may be a fractional NIN+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106D of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110.

In some embodiments, the UE 1100 comprises a plurality of power saving mechanisms. If the UE 1100 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. Since the device might not receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Reference in the specification to "an embodiment," "one embodiment" "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a fifth generation (5G) Evolved Node B (eNB) operable to communicate with a 5G User Equipment (UE) on a wireless network, comprising: one or more processors to: encode one or more 5G Physical Downlink Shared Channel (xPDSCH) transmissions; and arrange the one or more xPDSCH transmissions for transmission through one or more respectively corresponding transmission (Tx) beams, wherein the one or more xPDSCH transmissions carry one or more respectively corresponding 5G System Information Blocks (xSIBs).

In example 2, the apparatus of example 1, wherein the one or more processors are further to: arrange the one or more xPDSCH transmissions for transmission sweeping across the Tx beams in one or more respectively corresponding symbols or subframes periodically spaced by a number K of subframes.

In example 3, the apparatus of example 2, wherein the one or more xPDSCH transmissions are first xPDSCH transmissions of one or more respectively corresponding sequences of a number L of xPDSCH transmissions carrying xSIBs, and wherein the one or more processors are further to: arrange the one or more sequences of xPDSCH transmissions respectively for transmission through the one or more Tx beams, wherein the xPDSCH transmissions for a sequence of xPDSCH transmissions are arranged for transmission in symbols or subframes periodically spaced by a number J of subframes.

In example 4, the apparatus of example 3, wherein the first xPDSCH transmissions of the sequences of xPDSCH transmissions are arranged for transmission in L consecutive symbols or subframes; and wherein the number J is greater than the number of Tx beams.

In example 5, the apparatus of example 3, wherein the xPDSCH transmissions for a sequence of xPDSCH transmissions are arranged for transmission in L consecutive symbols or subframes.

In example 6, the apparatus of any of examples 3 through 5, wherein the xPDSCH transmissions for a sequence of xPDSCH transmissions are generated in accordance with one of: a Chase Combining technique, or a Redundancy Version technique using a predetermined Redundancy Version pattern.

In example 7, the apparatus of any of examples 2 through 6, wherein at least one of a starting subframe, a subframe offset for one of the Tx beams, and the number K is configured by one of: a 5G Master Information Block, a 5G Primary Synchronization Signal, a 5G Secondary Synchronization Signal, or a 5G Beam Reference Signal.

Example 8 provides a fifth generation (5G) Evolved Node B (eNB) device comprising an application processor, a memory, one or more antenna ports, and an interface for allowing the application processor to communicate with another device, the eNB device including the apparatus of any of examples 1 through 7.

Example 9 provides a method comprising: encoding, for a fifth generation (5G) Evolved Node-B (eNB), one or more 5G Physical Downlink Shared Channel (xPDSCH) transmissions; and arranging the one or more xPDSCH transmissions for transmission through one or more respectively corresponding transmission (Tx) beams, wherein the one or more xPDSCH transmissions carry one or more respectively corresponding 5G System Information Blocks (xSIBs).

In example 10, the method of example 9, the operation comprising: arranging the one or more xPDSCH transmissions for transmission sweeping across the Tx beams in one or more respectively corresponding symbols or subframes periodically spaced by a number K of subframes.

In example 11, the method of example 10, wherein the one or more xPDSCH transmissions are first xPDSCH transmissions of one or more respectively corresponding sequences of a number L of xPDSCH transmissions carrying xSIBs, comprising: arranging the one or more sequences of xPDSCH transmissions respectively for transmission through the one or more Tx beams, wherein the xPDSCH transmissions for a sequence of xPDSCH transmissions are arranged for transmission in symbols or subframes periodically spaced by a number J of subframes.

In example 12, the method of example 11, wherein the first xPDSCH transmissions of the sequences of xPDSCH transmissions are arranged for transmission in L consecutive symbols or subframes; and wherein the number J is greater than the number of Tx beams.

In example 13, the method of example 11, wherein the xPDSCH transmissions for a sequence of xPDSCH transmissions are arranged for transmission in L consecutive symbols or subframes.

In example 14, the method of any of examples 11 through 13, wherein the xPDSCH transmissions for a sequence of xPDSCH transmissions are generated in accordance with one of: a Chase Combining technique, or a Redundancy Version technique using a predetermined Redundancy Version pattern.

In example 15, the method of any of examples 10 through 14, wherein at least one of a starting subframe, a subframe offset for one of the Tx beams, and the number K is configured by one of: a 5G Master Information Block, a 5G Primary Synchronization Signal, a 5G Secondary Synchronization Signal, or a 5G Beam Reference Signal.

Example 16 provides machine readable storage media having machine executable instructions stored thereon that, when executed, cause one or more processors to perform a method according to any of examples 10 through 15.

Example 17 provides an apparatus of a fifth generation (5G) Evolved Node B (eNB) operable to communicate with a 5G User Equipment (UE) on a wireless network, comprising: means for encoding one or more 5G Physical Downlink Shared Channel (xPDSCH) transmissions; and means for arranging the one or more xPDSCH transmissions for transmission through one or more respectively corresponding transmission (Tx) beams, wherein the one or more xPDSCH transmissions carry one or more respectively corresponding 5G System Information Blocks (xSIBs).

In example 18, the apparatus of example 17, the operation comprising: means for arranging the one or more xPDSCH transmissions for transmission sweeping across the Tx beams in one or more respectively corresponding symbols or subframes periodically spaced by a number K of subframes.

In example 19, the apparatus of example 18, wherein the one or more xPDSCH transmissions are first xPDSCH transmissions of one or more respectively corresponding sequences of a number L of xPDSCH transmissions carrying xSIBs, comprising: means for arranging the one or more sequences of xPDSCH transmissions respectively for transmission through the one or more Tx beams, wherein the xPDSCH transmissions for a sequence of xPDSCH transmissions are arranged for transmission in symbols or subframes periodically spaced by a number J of subframes.

In example 20, the apparatus of example 19, wherein the first xPDSCH transmissions of the sequences of xPDSCH transmissions are arranged for transmission in L consecutive symbols or subframes; and wherein the number J is greater than the number of Tx beams.

In example 21, the apparatus of example 19, wherein the xPDSCH transmissions for a sequence of xPDSCH transmissions are arranged for transmission in L consecutive symbols or subframes.

In example 22, the apparatus of any of examples 19 through 21, wherein the xPDSCH transmissions for a sequence of xPDSCH transmissions are generated in accordance with one of: a Chase Combining technique, or a Redundancy Version technique using a predetermined Redundancy Version pattern.

In example 23, the apparatus of any of examples 18 through 22, wherein at least one of a starting subframe, a subframe offset for one of the Tx beams, and the number K is configured by one of: a 5G Master Information Block, a 5G Primary Synchronization Signal, a 5G Secondary Synchronization Signal, or a 5G Beam Reference Signal.

Example 24 provides machine readable storage media having machine executable instructions that, when executed, cause one or more processors to perform an operation comprising: encode, for a fifth generation (5G) Evolved Node-B (eNB), one or more 5G Physical Downlink Shared Channel (xPDSCH) transmissions; and arrange the one or more xPDSCH transmissions for transmission through one or more respectively corresponding transmission (Tx) beams, wherein the one or more xPDSCH transmissions carry one or more respectively corresponding 5G System Information Blocks (xSIBs).

In example 25, the machine readable storage media of example 24, the operation comprising: arrange the one or more xPDSCH transmissions for transmission sweeping across the Tx beams in one or more respectively corresponding symbols or subframes periodically spaced by a number K of subframes.

In example 26, the machine readable storage media of example 25, wherein the one or more xPDSCH transmissions are first xPDSCH transmissions of one or more respectively corresponding sequences of a number L of xPDSCH transmissions carrying xSIBs, and the operation comprising: arrange the one or more sequences of xPDSCH transmissions respectively for transmission through the one or more Tx beams, wherein the xPDSCH transmissions for a sequence of xPDSCH transmissions are arranged for transmission in symbols or subframes periodically spaced by a number J of subframes.

In example 27, the machine readable storage media of example 26, wherein the first xPDSCH transmissions of the sequences of xPDSCH transmissions are arranged for transmission in L consecutive symbols or subframes; and wherein the number J is greater than the number of Tx beams.

In example 28, the machine readable storage media of example 26, wherein the xPDSCH transmissions for a sequence of xPDSCH transmissions are arranged for transmission in L consecutive symbols or subframes.

In example 29, the machine readable storage media of any of examples 26 through 28, wherein the xPDSCH transmissions for a sequence of xPDSCH transmissions are generated in accordance with one of: a Chase Combining technique, or a Redundancy Version technique using a predetermined Redundancy Version pattern.

In example 30, the machine readable storage media of any of examples 25 through 29, wherein at least one of a starting subframe, a subframe offset for one of the Tx beams, and the number K is configured by one of: a 5G Master Information Block, a 5G Primary Synchronization Signal, a 5G Secondary Synchronization Signal, or a 5G Beam Reference Signal.

Example 31 provides an apparatus of a fifth generation (5G) Evolved Node B (eNB) operable to communicate with a 5G User Equipment (UE) on a wireless network, comprising: one or more processors to: encode one or more 5G Physical Downlink Shared Channel (xPDSCH) transmissions carrying one or more 5G System Information Blocks (xSIBs) for transmission through one or more transmission (Tx) beams, and schedule the one or more xPDSCH transmissions in accordance with a resource allocation having one or more parameters.

In example 32, the apparatus of example 31, wherein the resource allocation parameters comprise one or more of: a bitmap of subframes used for xSIB transmission, a starting subframe for xSIB transmission with respect to a System Frame Number zero of a transmitting cell, a periodicity of xSIB transmission, a frequency location of xSIB transmission, a configuration of xSIB transmission including a number of repeated subframes, a Chase Combining xSIB transmission type indicator, an Incremental Redundancy xSIB transmission type indicator, a Redundancy Version pattern for xSIB transmission, a frequency hopping enable indicator, a frequency hopping pattern, a starting OFDM symbol of xSIB transmission or an xPDSCH duration for xSIB transmission.

In example 33, the apparatus of either of examples 31 or 32, wherein the one or more processors are further to: process a 5G Physical Download Control Channel (xPDCCH) transmission, wherein the one or more xPDSCH transmissions are scheduled by the xPDCCH transmission.

In example 34, the apparatus of either of examples 31 through 33, wherein at least one of the resource allocation parameters and a Modulation and Coding Scheme (MCS) of the xPDSCH transmissions carrying xSIB have predetermined values.

In example 35, the apparatus of any of examples 31 through 34, wherein at least one of the resource allocation parameters and a Modulation and Coding Scheme (MCS) of the xPDSCH transmissions carrying xSIB are carried in a 5G Master Information Block (xMIB).

In example 36, the apparatus of any of examples 31 through 35, wherein at least one of the resource allocation parameters and a Modulation and Coding Scheme (MCS) of the xPDSCH transmissions carrying xSIB are derived from one or more of: a 5G Primary Synchronization Signal (xPSS), a 5G Secondary Synchronization Signal (xSSS), or a Beam Reference Signal (BRS); and wherein a frequency location used for xPDSCH transmissions carrying xSIB are defined as a function of at least one of: cell ID, virtual cell ID, BRS group ID, system frame number, subframe index, or slot index.

In example 37, the apparatus of any of examples 31 through 36, wherein the one or more processors are further to: process a 5G Physical Random Access Channel (xPRACH) transmission; and wherein the xPDSCH transmissions carrying xSIB are associated with a Random Access Response (RAR) transmission, and are transmitted after processing the xPRACH transmission.

Example 38 provides an Evolved Node B (eNB) device comprising an application processor, a memory, one or more antenna ports, and an interface for allowing the application processor to communicate with another device, the eNB device including the apparatus of any of examples 31 through 37.

Example 39 provides a method comprising: encoding, for a fifth generation (5G) Evolved Node B (eNB), one or more 5G Physical Downlink Shared Channel (xPDSCH) transmissions carrying one or more 5G System Information Blocks (xSIBs) for transmission through one or more transmission (Tx) beams, and scheduling the one or more xPDSCH transmissions in accordance with a resource allocation having one or more parameters.

In example 40, the method of example 39, wherein the resource allocation parameters comprise one or more of: a bitmap of subframes used for xSIB transmission, a starting subframe for xSIB transmission with respect to a System Frame Number zero of a transmitting cell, a periodicity of xSIB transmission, a frequency location of xSIB transmission, a configuration of xSIB transmission including a number of repeated subframes, a Chase Combining xSIB transmission type indicator, an Incremental Redundancy xSIB transmission type indicator, a Redundancy Version pattern for xSIB transmission, a frequency hopping enable indicator, a frequency hopping pattern, a starting OFDM symbol of xSIB transmission, or an xPDSCH duration for xSIB transmission.

In example 41, the method of either of examples 39 or 40, the operation comprising: processing a 5G Physical Download Control Channel (xPDCCH) transmission, wherein the one or more xPDSCH transmissions are scheduled by the xPDCCH transmission.

In example 42, the method of any of examples 39 through 41, wherein at least one of the resource allocation parameters and a Modulation and Coding Scheme (MCS) of the xPDSCH transmissions carrying xSIB have predetermined values.

In example 43, the method of any of examples 39 through 42, wherein at least one of the resource allocation parameters and a Modulation and Coding Scheme (MCS) of the xPDSCH transmissions carrying xSIB are carried in a 5G Master Information Block (xMIB).

In example 44, the method of any of examples 39 through 43, wherein at least one of the resource allocation parameters and a Modulation and Coding Scheme (MCS) of the xPDSCH transmissions carrying xSIB are derived from one or more of: a 5G Primary Synchronization Signal (xPSS), a 5G Secondary Synchronization Signal (xSSS), or a Beam Reference Signal (BRS); and wherein a frequency location used for xPDSCH transmissions carrying xSIB are defined as a function of at least one of: cell ID, virtual cell ID, BRS group ID, system frame number, subframe index, or slot index.

In example 45, the method of any of examples 39 through 44, the operation comprising: processing a 5G Physical Random Access Channel (xPRACH) transmission; and wherein the xPDSCH transmissions carrying xSIB are associated with a Random Access Response (RAR) transmission, and are transmitted after processing the xPRACH transmission.

Example 46 provides machine readable storage media having machine executable instructions stored thereon that, when executed, cause one or more processors to perform a method according to any of examples 39 through 45.

Example 47 provides an apparatus of a fifth generation (5G) Evolved Node B (eNB) operable to communicate with a 5G User Equipment (UE) on a wireless network, comprising: means for encoding one or more 5G Physical Downlink Shared Channel (xPDSCH) transmissions carrying one or more 5G System Information Blocks (xSIBs) for transmission through one or more transmission (Tx) beams, and means for scheduling the one or more xPDSCH transmissions in accordance with a resource allocation having one or more parameters.

In example 48, the apparatus of example 47, wherein the resource allocation parameters comprise one or more of: a bitmap of subframes used for xSIB transmission, a starting subframe for xSIB transmission with respect to a System Frame Number zero of a transmitting cell, a periodicity of xSIB transmission, a frequency location of xSIB transmission, a configuration of xSIB transmission including a number of repeated subframes, a Chase Combining xSIB transmission type indicator, an Incremental Redundancy xSIB transmission type indicator, a Redundancy Version pattern for xSIB transmission, a frequency hopping enable indicator, a frequency hopping pattern, a starting OFDM symbol of xSIB transmission. or an xPDSCH duration for xSIB transmission.

In example 49, the apparatus of either of examples 47 or 48, the operation comprising: means for processing a 5G Physical Download Control Channel (xPDCCH) transmission, wherein the one or more xPDSCH transmissions are scheduled by the xPDCCH transmission.

In example 50, the apparatus of any of examples 47 through 49, wherein at least one of the resource allocation parameters and a Modulation and Coding Scheme (MCS) of the xPDSCH transmissions carrying xSIB have predetermined values.

In example 51, the apparatus of any of examples 47 through 50, wherein at least one of the resource allocation parameters and a Modulation and Coding Scheme (MCS) of the xPDSCH transmissions carrying xSIB are carried in a 5G Master Information Block (xMIB).

In example 52, the apparatus of any of examples 47 through 51, wherein at least one of the resource allocation parameters and a Modulation and Coding Scheme (MCS) of the xPDSCH transmissions carrying xSIB are derived from one or more of: a 5G Primary Synchronization Signal (xPSS), a 5G Secondary Synchronization Signal (xSSS), or a Beam Reference Signal (BRS); and wherein a frequency location used for xPDSCH transmissions carrying xSIB are defined as a function of at least one of: cell ID, virtual cell ID, BRS group ID, system frame number, subframe index, or slot index.

In example 53, the apparatus of any of examples 47 through 52, the operation comprising: means for processing a 5G Physical Random Access Channel (xPRACH) transmission; and wherein the xPDSCH transmissions carrying xSIB are associated with a Random Access Response (RAR) transmission, and are transmitted after processing the xPRACH transmission.

Example 54 provides machine readable storage media having machine executable instructions that, when executed, cause one or more processors to perform an operation comprising: encode, for a fifth generation (5G) Evolved Node B (eNB), one or more 5G Physical Downlink Shared Channel (xPDSCH) transmissions carrying one or more 5G System Information Blocks (xSIBs) for transmission through one or more transmission (Tx) beams, and schedule the one or more xPDSCH transmissions in accordance with a resource allocation having one or more parameters.

In example 55, the machine readable storage media of example 54, wherein the resource allocation parameters comprise one or more of: a bitmap of subframes used for xSIB transmission, a starting subframe for xSIB transmission with respect to a System Frame Number zero of a transmitting cell, a periodicity of xSIB transmission, a frequency location of xSIB transmission, a configuration of xSIB transmission including a number of repeated subframes, a Chase Combining xSIB transmission type indicator, an Incremental Redundancy xSIB transmission type indicator, a Redundancy Version pattern for xSIB transmission, a frequency hopping enable indicator, a frequency hopping pattern, a starting OFDM symbol of xSIB transmission, or an xPDSCH duration for xSIB transmission.

In example 56, the machine readable storage media of either of examples 54 or 55, the operation comprising: process a 5G Physical Download Control Channel (xPDCCH) transmission, wherein the one or more xPDSCH transmissions are scheduled by the xPDCCH transmission.

In example 57, the machine readable storage media of any of examples 54 through 56, wherein at least one of the resource allocation parameters and a Modulation and Coding Scheme (MCS) of the xPDSCH transmissions carrying xSIB have predetermined values.

In example 58, the machine readable storage media of any of examples 54 through 57, wherein at least one of the resource allocation parameters and a Modulation and Coding Scheme (MCS) of the xPDSCH transmissions carrying xSIB are carried in a 5G Master Information Block (xMIB).

In example 59, the machine readable storage media of any of examples 54 through 58, wherein at least one of the resource allocation parameters and a Modulation and Coding Scheme (MCS) of the xPDSCH transmissions carrying xSIB are derived from one or more of: a 5G Primary Synchronization Signal (xPSS), a 5G Secondary Synchronization Signal (xSSS), or a Beam Reference Signal (BRS); and wherein a frequency location used for xPDSCH transmissions carrying xSIB are defined as a function of at least one of: cell ID, virtual cell ID, BRS group ID, system frame number, subframe index, or slot index.

In example 60, the machine readable storage media of any of examples 54 through 59, the operation comprising: process a 5G Physical Random Access Channel (xPRACH) transmission; and wherein the xPDSCH transmissions carrying xSIB are associated with a Random Access Response (RAR) transmission, and are transmitted after processing the xPRACH transmission.

In example 61, the apparatus of any of examples 1 through 7, 17 through 23, 31 through 37, and 47 through 53, wherein the one more processors comprise a baseband processor.

In example 62, the apparatus of any of examples 1 through 7, 17 through 23, 31 through 37, and 47 through 53, comprising a transceiver circuitry for at least one of: generating transmissions, encoding transmissions, processing transmissions, or decoding transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A user equipment (UE), comprising:
   one or more processors configured to:
      receive, from a base station, one or more Physical Downlink Shared Channel (PDSCH) transmissions through one or more transmission (Tx) beams in accordance with a resource allocation based on one or more resource allocation parameters and a schedule determined by the base station; and
      decode the one or more received PDSCH transmissions carrying one or more System Information Blocks (SIBs), wherein a first PDSCH transmission of the one or more PDSCH transmissions carries a first SIB of the one or more SIBs, and wherein the first PDSCH transmission is scheduled by a Physical Downlink Control Channel (PDCCH) transmission immediately ahead of the first PDSCH transmission and within a same subframe, and wherein the PDCCH transmission and the first PDSCH transmission carrying the first SIB are transmitted using a same Tx beam,
   wherein at least one of the one or more resource allocation parameters and a Modulation and Coding Scheme (MCS) of the one or more PDSCH transmissions carrying the one or more SIBs are derived from one or more of: a Primary Synchronization Signal (PSS), a Secondary Synchronization Signal (SSS), or a Beam Reference Signal (BRS), and
   wherein a frequency location used for the one or more PDSCH transmissions carrying the one or more SIBs is defined as a function of at least one of: a cell ID, a virtual cell ID, a BRS group ID, a system frame number, a subframe index, or a slot index; and
   storage coupled to the one or more processors and configured to store the one or more SIBs.

2. The UE of claim 1, wherein the one or more resource allocation parameters comprise one or more of: a bitmap of subframes used for SIB transmission, a starting subframe for SIB transmission with respect to a System Frame Number zero of a transmitting cell, a periodicity of SIB transmission, a frequency location of SIB transmission, a configuration of SIB transmission including a number of repeated subframes, a Chase Combining SIB transmission type indicator, an Incremental Redundancy SIB transmission type indicator, a Redundancy Version pattern for SIB transmission, a frequency hopping enable indicator, a frequency hopping pattern, a starting OFDM symbol of SIB transmission, or a PDSCH duration for SIB transmission.

3. The UE of claim 1, wherein at least one of the one or more resource allocation parameters and the Modulation and Coding Scheme (MCS) of the one or more PDSCH transmissions carrying the one or more SIBs have predetermined values.

4. The UE of claim 1, wherein at least one of the one or more resource allocation parameters and the Modulation and Coding Scheme (MCS) of the one or more PDSCH transmissions carrying the one or more SIBs are carried in a Master Information Block (MIB).

5. The UE of claim 1, wherein the one or more PDSCH transmissions through the one or more Tx beams include the first PDSCH transmission transmitted by a first Tx beam of the one or more Tx beams at a first time instance, and a second PDSCH transmission adjacent to the first PDSCH transmission transmitted by a second Tx beam at a second time instance, wherein the first Tx beam is different from the second Tx beam, and the first time instance and the second time instance are separated by a number K of subframes.

6. The UE of claim 1, wherein the one or more PDSCH transmissions are first PDSCH transmissions of one or more respectively corresponding sequences of a number L of PDSCH transmissions carrying the one or more SIBs, and wherein the one or more processors are further configured to:
   receive the one or more corresponding sequences of PDSCH transmissions respectively through the one or more Tx beams.

7. The UE of claim 6, wherein PDSCH transmissions for a sequence of PDSCH transmissions of the one or more corresponding sequences of PDSCH transmissions are arranged for transmission in symbols or subframes periodically spaced by a number J of subframes.

8. The UE of claim 7, wherein N is a number of Tx beams, wherein the first PDSCH transmissions of the one or more corresponding sequences of PDSCH transmissions are arranged for transmission in the number N of consecutive symbols or subframes, and
   wherein the number J is greater than the number N.

9. The UE of claim 6, wherein PDSCH transmissions for a sequence of PDSCH transmissions of the one or more corresponding sequences of PDSCH transmissions are arranged for transmission in L consecutive symbols or subframes.

10. The UE of claim 9,
wherein the PDSCH transmissions for the sequence of PDSCH transmissions are generated in accordance with one of: a Chase Combining technique, or a Redundancy Version technique using a predetermined Redundancy Version pattern.

11. One or more non-transitory, computer-readable media having instructions that, when executed, cause a user equipment (UE) to perform operations, the operations comprising:
receiving, from a base station, one or more Physical Downlink Shared Channel (PDSCH) transmissions through one or more transmission (Tx) beams in accordance with a resource allocation based on one or more resource allocation parameters and a schedule determined by the base station; and
decoding the one or more received PDSCH transmissions carrying one or more System Information Blocks (SIBs), wherein a first PDSCH transmission of the one or more PDSCH transmissions carries a first SIB of the one or more SIBs, and wherein the first PDSCH transmission is scheduled by a Physical Downlink Control Channel (PDCCH) transmission immediately ahead of the first PDSCH transmission and within a same subframe, and wherein the PDCCH transmission and the first PDSCH transmission carrying the first SIB are transmitted using a same Tx beam,
wherein at least one of the one or more resource allocation parameters and a Modulation and Coding Scheme (MCS) of the one or more PDSCH transmissions carrying the one or more SIBs are derived from one or more of: a Primary Synchronization Signal (PSS), a Secondary Synchronization Signal (SSS), or a Beam Reference Signal (BRS), and
wherein a frequency location used for the one or more PDSCH transmissions carrying the one or more SIBs is defined as a function of at least one of: a cell ID, a virtual cell ID, a BRS group ID, a system frame number, a subframe index, or a slot index.

12. The one or more non-transitory, computer-readable media of claim 11,
wherein the one or more resource allocation parameters comprise one or more of: a bitmap of subframes used for SIB transmission, a starting subframe for SIB transmission with respect to a System Frame Number zero of a transmitting cell, a periodicity of SIB transmission, a frequency location of SIB transmission, a configuration of SIB transmission including a number of repeated subframes, a Chase Combining SIB transmission type indicator, an Incremental Redundancy SIB transmission type indicator, a Redundancy Version pattern for SIB transmission, a frequency hopping enable indicator, a frequency hopping pattern, a starting OFDM symbol of SIB transmission, or a PDSCH duration for SIB transmission.

13. The one or more non-transitory, computer-readable media of claim 11,
wherein at least one of the one or more resource allocation parameters and the Modulation and Coding Scheme (MCS) of the one or more PDSCH transmissions carrying the one or more SIBs have predetermined values.

14. The one or more non-transitory, computer-readable media of claim 11,
wherein at least one of the one or more resource allocation parameters and the Modulation and Coding Scheme (MCS) of the one or more PDSCH transmissions carrying the one or more SIBs are carried in a Master Information Block (MIB).

15. The one or more non-transitory, computer-readable media of claim 11,
wherein the one or more PDSCH transmissions through the one or more Tx beams include the first PDSCH transmission transmitted by a first Tx beam of the one or more Tx beams at a first time instance, and a second PDSCH transmission adjacent to the first PDSCH transmission transmitted by a second Tx beam at a second time instance, wherein the first Tx beam is different from the second Tx beam, and the first time instance and the second time instance are separated by a number K of subframes.

16. A method performed by a user equipment (UE), comprising:
receiving, from a base station, one or more Physical Downlink Shared Channel (PDSCH) transmissions through one or more transmission (Tx) beams in accordance with a resource allocation based on one or more resource allocation parameters and a schedule determined by the base station; and
decoding one or more received PDSCH transmissions carrying one or more System Information Blocks (SIBs), wherein a first PDSCH transmission of the one or more PDSCH transmissions carries a first SIB of the one or more SIBs, and wherein the first PDSCH transmission is scheduled by a Physical Downlink Control Channel (PDCCH) transmission immediately ahead of the first PDSCH transmission and within a same subframe, and wherein the PDCCH transmission and the PDSCH transmission carrying the first SIB are transmitted using a same Tx beam,
wherein at least one of the one or more resource allocation parameters and a Modulation and Coding Scheme (MCS) of the one or more PDSCH transmissions carrying the one or more SIBs are derived from one or more of: a Primary Synchronization Signal (PSS), a Secondary Synchronization Signal (SSS), or a Beam Reference Signal (BRS), and
wherein a frequency location used for the one or more PDSCH transmissions carrying the one or more SIBs is defined as a function of at least one of: a cell ID, a virtual cell ID, a BRS group ID, a system frame number, a subframe index, or a slot index.

17. The method of claim 16,
wherein the one or more resource allocation parameters comprise one or more of: a bitmap of subframes used for SIB transmission, a starting subframe for SIB transmission with respect to a System Frame Number zero of a transmitting cell, a periodicity of SIB transmission, a frequency location of SIB transmission, a configuration of SIB transmission including a number of repeated subframes, a Chase Combining SIB transmission type indicator, an Incremental Redundancy SIB transmission type indicator, a Redundancy Version pattern for SIB transmission, a frequency hopping enable indicator, a frequency hopping pattern, a starting OFDM symbol of SIB transmission, or a PDSCH duration for SIB transmission.

18. The method of claim 16, wherein at least one of the one or more resource allocation parameters and the Modulation and Coding Scheme (MCS) of the one or more PDSCH transmissions carrying the one or more SIBs are carried in a Master Information Block (MIB).

\* \* \* \* \*